(12) United States Patent
Norman et al.

(10) Patent No.: US 11,715,141 B2
(45) Date of Patent: Aug. 1, 2023

(54) SYSTEMS AND METHODS FOR RECORDING TRANSACTION AND PRODUCT CUSTOMIZATION INFORMATION

(71) Applicant: Lowe's Companies, Inc., Mooresville, NC (US)

(72) Inventors: Timothy Darren Norman, Elk Park, NC (US); Bryan Wilbourne Pruet, Mooresville, NC (US)

(73) Assignee: Lowe's Companies, Inc., Mooresville, NC (US)

( * ) Notice: Subject to any disclaimer, the term of this patent is extended or adjusted under 35 U.S.C. 154(b) by 0 days.

(21) Appl. No.: 16/528,975

(22) Filed: Aug. 1, 2019

(65) Prior Publication Data

US 2019/0355038 A1   Nov. 21, 2019

Related U.S. Application Data

(63) Continuation of application No. 13/799,851, filed on Mar. 13, 2013, now Pat. No. 10,410,266.

(60) Provisional application No. 61/681,084, filed on Aug. 8, 2012.

(51) Int. Cl.
*G06Q 30/0601* (2023.01)
*G06Q 10/0637* (2023.01)
(Continued)

(52) U.S. Cl.
CPC ..... *G06Q 30/0621* (2013.01); *G06Q 10/0637* (2013.01); *G06Q 30/016* (2013.01); *G06Q 30/06* (2013.01)

(58) Field of Classification Search
CPC ......... G06Q 10/0637; G06Q 10/06398; G06Q 10/08; G06Q 10/087; G06Q 30/02; G06Q 30/0273; G06Q 30/06
See application file for complete search history.

(56) References Cited

U.S. PATENT DOCUMENTS

| 5,357,439 A | 10/1994 | Matsuzaki et al. |
| 5,570,291 A | 10/1996 | Dudle et al. |

(Continued)

FOREIGN PATENT DOCUMENTS

| EP | 1139263 | 10/2001 |
| EP | 1431890 | 6/2004 |

(Continued)

OTHER PUBLICATIONS

Daniel Castro et al. (2010). Embracing the self-service economy. ITIF. (Year: 2010).*

(Continued)

*Primary Examiner* — Peter Ludwig
(74) *Attorney, Agent, or Firm* — Kilpatrick Townsend & Stockton LLP

(57) ABSTRACT

Methods, devices, systems and computer readable media can be configured to facilitate receipt of a unique product identifier. The unique product identifier can correspond to a customized product. In one embodiment, an account identifier is received. The account identifier may correspond to an online account of a consumer purchasing the customized product. In an embodiment, an object associated with the online account is determined. The object may represent a portion of a building. In an embodiment, the object is associated with the customized product.

20 Claims, 6 Drawing Sheets

(51) Int. Cl.
  *G06Q 30/06* (2023.01)
  *G06Q 30/016* (2023.01)

(56) References Cited

U.S. PATENT DOCUMENTS

| | | | |
|---|---|---|---|
| 5,592,511 | A | 1/1997 | Schoen et al. |
| 5,615,123 | A | 3/1997 | Davidson et al. |
| 5,745,765 | A | 4/1998 | Paseman |
| 6,330,592 | B1 | 12/2001 | Makuch et al. |
| 6,338,349 | B1 | 1/2002 | Robinson et al. |
| 6,415,261 | B1 | 7/2002 | Cybul et al. |
| 6,516,245 | B1 | 2/2003 | Dirksing et al. |
| 6,726,947 | B1 | 4/2004 | Gutwein et al. |
| 6,759,072 | B1 | 7/2004 | Gutwein et al. |
| 6,985,876 | B1 | 1/2006 | Lee |
| 7,177,484 | B2 | 2/2007 | Fredlund et al. |
| 7,200,568 | B2 | 4/2007 | Dodd |
| 7,233,885 | B1 | 6/2007 | Larabee et al. |
| 7,302,115 | B2 | 11/2007 | Fredlund et al. |
| 7,369,913 | B2 | 5/2008 | Heminway et al. |
| 7,386,832 | B2 | 6/2008 | Brunner et al. |
| 7,437,321 | B2 | 10/2008 | Hanechak |
| 7,490,057 | B2 | 2/2009 | Connolly et al. |
| 7,519,548 | B2 | 4/2009 | Hanechak et al. |
| 7,523,411 | B2 | 4/2009 | Carlin |
| 7,566,007 | B2 | 7/2009 | Aoki et al. |
| 7,580,871 | B2 * | 8/2009 | Brunner ............... G06Q 30/06 705/26.5 |
| 7,627,503 | B1 | 12/2009 | Champagne et al. |
| 7,650,296 | B1 | 1/2010 | Brunner et al. |
| 7,650,381 | B2 | 1/2010 | Peters |
| 7,661,170 | B2 | 2/2010 | Goode et al. |
| 7,676,402 | B2 | 3/2010 | Moody |
| 7,687,213 | B2 | 3/2010 | Lobo et al. |
| 7,729,956 | B2 | 6/2010 | Peters |
| 7,797,167 | B2 | 9/2010 | Hanechak et al. |
| 7,815,435 | B2 | 10/2010 | Riley |
| 7,885,861 | B2 | 2/2011 | Mills |
| 7,908,184 | B2 | 3/2011 | Choe |
| 7,909,241 | B2 | 3/2011 | Stone et al. |
| 7,917,485 | B1 | 3/2011 | Gibson et al. |
| 7,983,964 | B2 | 7/2011 | Hanechak et al. |
| 7,996,756 | B2 | 8/2011 | Eilers et al. |
| 8,036,951 | B2 | 10/2011 | Kraft et al. |
| 8,041,607 | B1 | 10/2011 | Coursol |
| 8,319,788 | B2 * | 11/2012 | Buzyn ............... G06F 3/04847 345/594 |
| 8,380,464 | B2 | 2/2013 | Correl et al. |
| 8,427,498 | B2 | 4/2013 | Ou et al. |
| 8,517,267 | B2 * | 8/2013 | Reynolds ............... G06Q 30/06 235/385 |
| 8,523,067 | B2 | 9/2013 | Stone et al. |
| 8,537,156 | B2 | 9/2013 | Sellem |
| 8,540,153 | B2 | 9/2013 | Stone et al. |
| 10,410,266 | B2 | 9/2019 | Norman et al. |
| 2001/0051904 | A1 | 12/2001 | Nishimura |
| 2002/0007322 | A1 | 1/2002 | Stromberg |
| 2002/0077848 | A1 | 6/2002 | Campbell |
| 2002/0107672 | A1 | 8/2002 | Povich |
| 2002/0143564 | A1 | 10/2002 | Webb et al. |
| 2003/0097311 | A1 | 5/2003 | Shinohara et al. |
| 2003/0149635 | A1 | 8/2003 | Burklow et al. |
| 2004/0172325 | A1 | 9/2004 | Blanco et al. |
| 2004/0193474 | A1 | 9/2004 | Digiacomo |
| 2005/0010539 | A1 | 1/2005 | Zwickerk et al. |
| 2005/0081161 | A1 | 4/2005 | MacInnes et al. |
| 2005/0100210 | A1 | 5/2005 | Rice et al. |
| 2005/0147442 | A1 | 7/2005 | Walker et al. |
| 2005/0177453 | A1 | 8/2005 | Anton et al. |
| 2005/0216304 | A1 | 9/2005 | Westphal |
| 2005/0289018 | A1 | 12/2005 | Sullivan et al. |
| 2006/0010004 | A1 | 1/2006 | Deckner |
| 2006/0129647 | A1 | 6/2006 | Kaghazian |
| 2006/0155561 | A1 | 7/2006 | Harper |
| 2006/0167577 | A1 | 7/2006 | Clark et al. |
| 2006/0178943 | A1 * | 8/2006 | Rollinson ............ G06Q 30/0601 705/26.1 |
| 2006/0190110 | A1 | 8/2006 | Holt et al. |
| 2007/0033108 | A1 | 2/2007 | Luhr |
| 2007/0033568 | A1 | 2/2007 | Barrieau et al. |
| 2007/0268523 | A1 | 11/2007 | Ferrara et al. |
| 2008/0033838 | A1 | 2/2008 | Wang |
| 2008/0087352 | A1 | 4/2008 | Malanowicz et al. |
| 2008/0091551 | A1 | 4/2008 | Olheiser et al. |
| 2008/0162558 | A1 | 7/2008 | Rao |
| 2008/0177639 | A1 | 7/2008 | Kuppersmith et al. |
| 2008/0228599 | A1 * | 9/2008 | Webb ............... G06Q 30/0641 705/26.41 |
| 2008/0313055 | A1 | 12/2008 | Stinson et al. |
| 2009/0037298 | A1 | 2/2009 | Hanechak |
| 2009/0048937 | A1 | 2/2009 | Contreras et al. |
| 2009/0167553 | A1 * | 7/2009 | Hong ............... G06Q 10/06 340/4.61 |
| 2009/0183122 | A1 * | 7/2009 | Webb ............... G07F 17/16 715/840 |
| 2009/0192854 | A1 | 7/2009 | Pietrucha, Jr. et al. |
| 2009/0228367 | A1 * | 9/2009 | Hughes ............ G06Q 30/0601 705/26.1 |
| 2009/0259555 | A1 * | 10/2009 | Carroll ............... G07F 7/00 705/25 |
| 2009/0313140 | A1 | 12/2009 | Colwell |
| 2009/0327251 | A1 | 12/2009 | Walmer |
| 2010/0014106 | A1 * | 1/2010 | Hoshii ............... G06Q 30/04 358/1.9 |
| 2010/0027961 | A1 | 2/2010 | Gentile et al. |
| 2010/0030335 | A1 | 2/2010 | Arramon |
| 2010/0031149 | A1 | 2/2010 | Gentile et al. |
| 2010/0036753 | A1 | 2/2010 | Harvill et al. |
| 2010/0100834 | A1 * | 4/2010 | MacDonald ....... G06Q 30/0641 715/764 |
| 2010/0106540 | A1 | 4/2010 | Reasoner |
| 2010/0114738 | A1 | 5/2010 | Chung |
| 2010/0121739 | A1 * | 5/2010 | McCarthy .......... G06Q 30/0601 705/26.1 |
| 2010/0161394 | A1 | 6/2010 | Bell et al. |
| 2010/0162098 | A1 | 6/2010 | Tirrella |
| 2010/0165369 | A1 | 7/2010 | Walker, Jr. et al. |
| 2010/0185309 | A1 * | 7/2010 | Ohiaeri ............ G06Q 30/0621 700/98 |
| 2010/0211885 | A1 | 8/2010 | Berg et al. |
| 2010/0274676 | A1 | 10/2010 | Hrudka |
| 2010/0325043 | A1 | 12/2010 | Buchanan et al. |
| 2011/0040609 | A1 | 2/2011 | Hawkins et al. |
| 2011/0098837 | A1 | 4/2011 | Yuecel et al. |
| 2011/0131087 | A1 | 6/2011 | Nair |
| 2011/0131112 | A1 | 6/2011 | Choe |
| 2011/0173088 | A1 | 7/2011 | Stone et al. |
| 2011/0202422 | A1 | 8/2011 | Brunner et al. |
| 2011/0231004 | A1 | 9/2011 | Henry |
| 2011/0238484 | A1 | 9/2011 | Toumayan et al. |
| 2011/0246352 | A1 | 10/2011 | Zagara et al. |
| 2011/0251914 | A1 | 10/2011 | Caine |
| 2011/0270974 | A1 | 11/2011 | Burdette et al. |
| 2011/0276427 | A1 | 11/2011 | McNall et al. |
| 2011/0276428 | A1 | 11/2011 | Hanechak et al. |
| 2011/0282476 | A1 | 11/2011 | Hegemier et al. |
| 2011/0313878 | A1 * | 12/2011 | Norman ............ G06Q 30/0621 705/26.5 |
| 2012/0191522 | A1 * | 7/2012 | McLaughlin ........ G06Q 30/02 705/26.8 |
| 2013/0030955 | A1 * | 1/2013 | David ............... H04W 4/021 705/26.8 |
| 2013/0317921 | A1 * | 11/2013 | Havas ............... G06Q 20/20 705/15 |
| 2014/0046787 | A1 | 2/2014 | Norman et al. |
| 2014/0207663 | A1 | 7/2014 | Iannace |

FOREIGN PATENT DOCUMENTS

| | | |
|---|---|---|
| EP | 2147617 | 1/2010 |
| GB | 2422920 | 8/2006 |
| GB | 2433798 | 7/2007 |
| WO | 0112038 | 2/2001 |

(56) References Cited

FOREIGN PATENT DOCUMENTS

| | | |
|---|---|---|
| WO | 0143034 | 6/2001 |
| WO | 0188824 | 11/2001 |
| WO | 2005069181 | 7/2005 |
| WO | 2006081351 | 8/2006 |
| WO | 2008043136 | 4/2008 |
| WO | 2008045418 | 4/2008 |
| WO | 2009158566 | 12/2009 |
| WO | 2010014750 | 2/2010 |
| WO | 2010022404 | 2/2010 |
| WO | 2010034000 | 3/2010 |
| WO | 2010048624 | 4/2010 |

OTHER PUBLICATIONS

UX Rehab (Jun. 3, 2010). Inspiration: Wawa makes ordering on-the-go easy and fin (and increases upsell). (Year: 2010).*
Progressive Grocer (2003). Wawa teams radiant systems for self-service kiosks. (Year: 2003).*
CA2,985,789, "Notice of Allowance", dated Nov. 6, 2020, 1 page.
U.S. Appl. No. 13/799,851, "Advisory Action", dated Dec. 31, 2015, 3 pages.
U.S. Appl. No. 13/799,851, "Final Office Action", dated Mar. 12, 2014, 17 pages.
U.S. Appl. No. 13/799,851, "Final Office Action", dated Aug. 26, 2015, 5 pages.
U.S. Appl. No. 13/799,851, "Non-Final office action", dated Nov. 21, 2013, 13 pages.
U.S. Appl. No. 13/799,851, "Non-Final Office Action", dated Mar. 18, 2015, 15 pages.
U.S. Appl. No. 13/799,851, "Non-Final Office Action", dated Jan. 28, 2015, 16 pages.
U.S. Appl. No. 13/799,851, "Notice of Allowance", dated Apr. 29, 2019, 9 pages.
CA2,822,865, "Notice of Allowance", dated Oct. 3, 2017, 1 page.
CA2,822,865, "Office Action", dated Dec. 11, 2014, 4 pages.
CA2,822,865, "Office Action", dated Oct. 11, 2016, 5 pages.
CA2,822,865, "Office Action", dated Sep. 25, 2015, 5 pages.
CA2,985,789, "Office Action", dated Oct. 3, 2018, 3 pages.
Lowes, "MyLowe's—Revolutionary Home Management Tool", Business Wire, Oct. 24, 2011.
Young , "Modeling the Impact of Automated Materials Locating and Tracking Technology on the Construction Supply Network", American Society of Civil Engineers., 2009, pp. 41-50.
CA2,985,789, "Office Action", dated Oct. 7, 2019, 4 pages.

* cited by examiner

SYSTEMS AND METHODS FOR RECORDING TRANSACTION AND PRODUCT CUSTOMIZATION INFORMATION

CROSS-REFERENCES TO RELATED APPLICATIONS

This application is a continuation of U.S. patent application Ser. No. 13/799,851, filed Mar. 13, 2013, which application claims the benefit of U.S. Provisional Application No. 61/681,084, filed Aug. 8, 2012, the entire contents of which are hereby incorporated by reference in their entirety for all purposes.

FIELD OF THE INVENTION

This disclosure relates generally to customized products and more particularly to the ordering and/or management of customized products and related information.

BACKGROUND

Traditionally, consumers have purchased products at in-store retail locations. The advent of online shopping, however, has greatly influenced consumer spending and enabled consumers to purchase products without physically going to in-store retail locations. Furthermore, many retailers now have both in-store retail locations as well as online websites in which consumers can purchase products. Managing and tracking consumers' purchases at both in-store retail locations and online would be advantageous. While some management and tracking of consumer purchases is available, there is also a need for more efficient systems and methods and for systems and methods to manage and track certain types of purchases.

BRIEF SUMMARY

One exemplary embodiment involves a method comprising: receiving a customized paint color from a paint customization station in a retail location; determining a unique product identifier corresponding to the customized paint color; receiving, by a point-of-sale device in the retail location, the unique product identifier, the point-of-sale device being different than the paint customization station; receiving, by the point-of-sale device in the retail location, an account identifier corresponding to an online account of a consumer purchasing the customized paint color; and associating the customized paint color with the online account.

In some embodiments, receiving, by a point-of-sale device in the retail location, the unique product identifier comprises: receiving, by a point-of-sale device in the retail location, a UPC code associated with the customized paint color, wherein the customized paint color comprises a pre-customized paint color. In some embodiments, determining a unique product identifier corresponding to the customized paint color comprises: the paint customization station in the retail location querying a data store to determine that a unique product identifier corresponding to the customized paint color does not exist in the data store; generating the unique product identifier; storing the unique product identifier in the data store; and associating the unique product identifier with information corresponding to the customized paint color. In some embodiments, determining a unique product identifier corresponding to the customized paint color comprises: the paint customization station in the retail location querying a data store to determine that a unique product identifier associated with the customized paint color exists in the data store.

In some embodiments, a method further comprises: receiving, by a server, a request to associate the customized paint color associated with the online account with a wall of a room, the wall of the room associated with the online account; and associating, by the server, the wall of the room with the customized paint color. In some embodiments, a method further comprises: receiving, by a server, a request to transfer the customized paint color to a second online account; and associating, by the server, the customized paint color with the second online account. In some embodiments, a method further comprises: removing an association between the customized paint color and the online account. In some embodiments, associating, by the server, the customized paint color with the second online account comprises: determining first information associated with the customized paint color, wherein the first information comprises a purchase price for the customized paint color; selecting a portion of the first information to associate with the second online account, the portion of the first information not including the purchase price for the customized paint color; and associating the portion of the first information with the second online account.

Another exemplary embodiment involves a method comprising: receiving an order from a first electronic device in a retail location, the order comprising a customized product; determining a unique product identifier corresponding to the customized product; receiving, by a second electronic device in the retail location, the unique product identifier, the second electronic device being different than the first electronic device; receiving, by the second electronic device in the retail location, an account identifier corresponding to an online account of a consumer purchasing the customized product; and associating the customized product with the online account.

In some embodiments, the customized product comprises at least one of a paint color, a window shade, a blind, a chain, a wire, a lumber board, and a fence. In some embodiments the second electronic device comprises a point-of-sale system. In some embodiments, the first electronic device is configured to enable product customization.

Another exemplary embodiment involves a method comprising: receiving a unique product identifier, the unique product identifier corresponding to a customized product; receiving an account identifier, the account identifier corresponding to an online account of a consumer purchasing the customized product; determining an object associated with the online account, the object representing a portion of a building; and associating the object with the customized product.

In some embodiments, a method further comprises: generating the unique product identifier; and associating the unique product identifier with information corresponding to the customized product, wherein the information corresponding to the customized product comprises a base product and customization information for the base product. In some embodiments, the customized product comprises at least one of a customized paint color, a customized blind, a customized chain, a customized lumber board, a customized wire, and a customized shade. In some embodiments, a method further comprises: generating a transaction identification, the transaction identification associated with an order for the customized product; associating the transaction identification with the customized product; associating the transaction identification with information corresponding to the order for the customized product, the information comprising a price for the customized product; and associating the transaction identification with the online account.

In some embodiments, a method further comprises: receiving a request to transfer a portion of the information corresponding to the order for the customized product to a second online account; determining the portion of the information corresponding to the order for the customized product to transfer to the second online account, the portion of the information including some, but not all, of the information corresponding to the order for the customized product; and associating the portion of the information corresponding to the order for the customized product with the second online account. In some embodiments, a method further comprises: receiving a request to transfer the object to a second online account; and in response to receiving the request, associating the object and the customized product with the second online account.

In some embodiments, a method further comprises receiving, at a point-of-sale system in a retail location, the unique product identifier and the account identifier. In some embodiments, determining an object associated with the online account comprises: receiving a request, by a web server, from a client device, the request comprising an object identification and the unique product identifier, the object identification associated with the online account; and wherein associating the object with the customized product comprises: creating an association, in a data store, between the object identification and the unique product identifier. In some embodiments, the object representing the portion of the building comprises a room. In some embodiments, the object representing the portion of the building comprises a wall. In some embodiments, the unique product identifier comprises at least one of a UPC code and a QR code. In some embodiments, the account identifier comprises at least one of a username, a password, and a unique key.

An exemplary system comprises: a product customization station, the product customization station comprising: a first input device; a first output device; a first computer readable medium; and a first processor in communication with the first input device, the first output device, and the first computer readable medium, the first processor configured for: receiving an order for a customized product; and determining a unique product identifier associated with the customized product. The exemplary system further comprises a point-of-sale device, the point-of-sale-device comprising: a second input device; a second output device; a second computer readable medium; and a second processor in communication with the second input device, the second output device, and the second computer readable medium, the second processor configured for: receiving the unique product identifier associated with the customized product; receiving an account identifier corresponding to an online account; and associating the customized product with the online account. The exemplary system further comprises: a web server, the web server comprising: a third input device; a third output device; a third computer readable medium; and a third processor in communication with the third input device, the third output device, and the third computer readable medium, the third processor configured for: receiving the account identifier corresponding to the online account; receiving a request to associate the customized product with an object, the object associated with the online account; and in response to receiving the request, associating the object with the customized product.

An exemplary computer readable medium comprising program code, comprises: program code for receiving a unique product identifier, the unique product identifier corresponding to a customized product; program code for receiving an account identifier, the account identifier corresponding to an online account of a consumer purchasing the customized product; program code for determining an object associated with the online account, the object representing a portion of a building; and program code for associating the object with the customized product.

These illustrative features are mentioned not to limit or define the disclosure, but to provide examples to aid understanding thereof. Additional embodiments are discussed in the Detailed Description, and further description is provided there. Advantages offered by one or more of the embodiments may be further understood by examining this specification or by practicing one or more embodiments presented.

BRIEF DESCRIPTION OF THE DRAWINGS

These and other features, aspects, and advantages of the present disclosure are better understood when the following Detailed Description is read with reference to the accompanying drawings, where.

DETAILED DESCRIPTION

Figure 1:
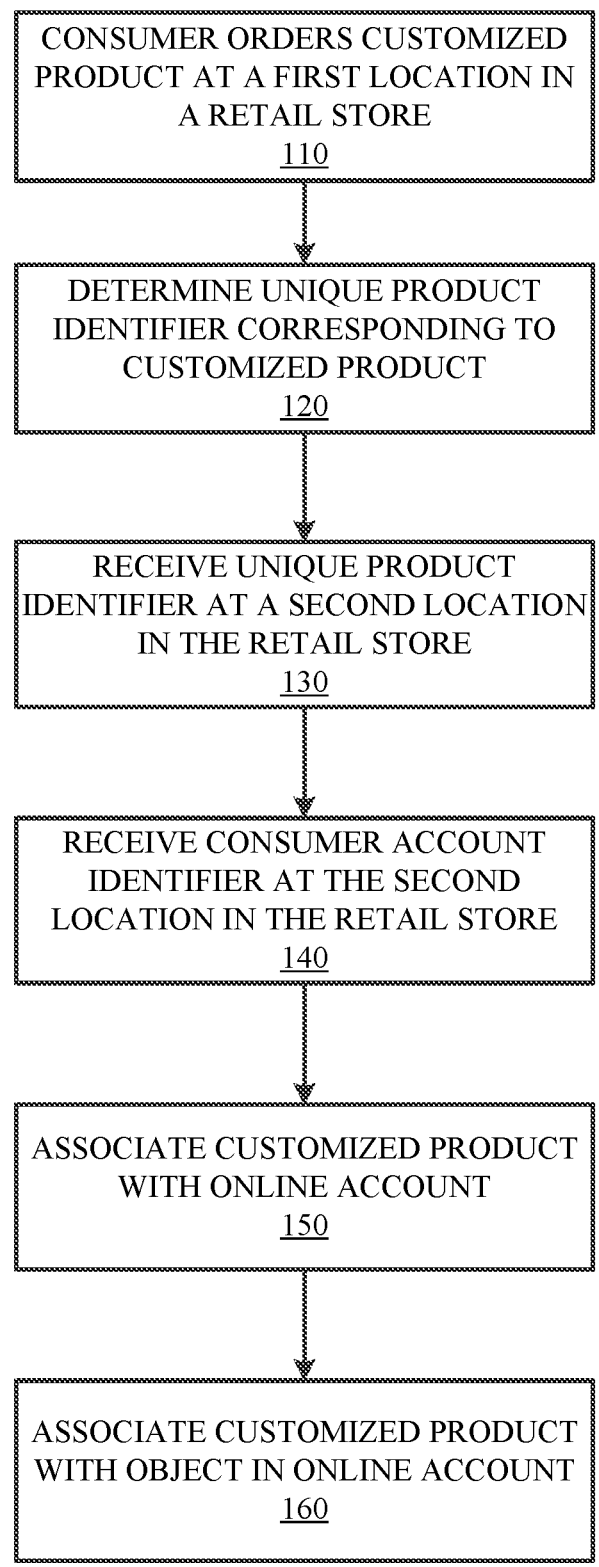
FIG. 1 is a flow chart illustrating a method of selling a customized product to a consumer at a retail location and associating the customized product with an online account corresponding to the consumer.

Systems and methods disclosed herein relate generally to the management of customized products. For example, FIG. 1 illustrates a method 100 of selling a customized product to a consumer at a retail location and associating the customized product with an online account corresponding to the consumer. Such a method 100 may be performed by one or more electronic devices, such as a tablet computer, mobile phone, notebook computer, desktop computer, point-of-sale system, or other computing device(s) comprising an input device such as a mouse, trackpad, keyboard, touch-screen, barcode scanner, or other input device, as described herein. For example, in some embodiments, method 100 may be performed by one or more electronic devices, such as electronic device 200 shown in FIG. 2, and/or one or more devices shown in system 300 of FIG. 3.

The method 100 shown in FIG. 1 begins when a consumer orders a customized product at a first location within a retail store 110. For example, a consumer may order a particular custom color of paint at a paint department of a home improvement store (e.g., at the paint mixing or customization station of the store). Once the consumer orders the customized product at the first location in the retail store 110, the method proceeds to block 120. In block 120, a unique product identifier corresponding to the customized product is determined. For example, a unique product identifier—such as a unique barcode—corresponding to the custom paint color (e.g., indicative of paint color formula) may be created by a first electronic device in the paint department of the home improvement store. As another example, a unique product identifier corresponding to the custom paint color may be determined by querying a data store with information corresponding to the custom product and receiving a unique product identifier from the data store. The unique product identifier may be physically affixed to the customized product and/or its container, label, tag or packaging. For example, in one embodiment, a unique barcode is printed and physically affixed to a paint can containing the customized paint color.

Once the unique product identifier corresponding to the customized product has been determined 120, the method 100 proceeds to block 130. In block 130, the unique product identifier corresponding to the customized product is received at a second location in the retail store. For example, the consumer may take the paint can with the affixed unique barcode to a checkout location in the home improvement store. The checkout location may be a physically distinct location from where the customized product was ordered and/or customized. In this embodiment, a second electronic device receives the unique product identifier. For example, the unique barcode on the paint may be scanned by a cashier at a point-of-sale system in the retail store. As another example, a UPC code or other identifier associated with information usable to identify a customized product—such as a UPC code or other identifier corresponding to a manufacturer, quantity, price, other identification information, or a combination thereof—may be scanned, manually entered, or otherwise obtained by a cashier at a point-of-sale system. The point-of-sale system may be a different electronic device than the first electronic device that created the unique product identifier.

Once the unique product identifier corresponding to the customized product is received at the second location in the retail store 130, the method 100 proceeds to block 140. In block 140, a consumer account identifier is received at the second location in the retail store. The consumer account identifier may be associated with an online account of the consumer purchasing the customized product. For example, a consumer may have a key FOB containing information usable to identify an online account associated with the consumer. In this embodiment, information from the key FOB is transferred from the key FOB to an electronic device at the second location in the retail store. For example, as the consumer checks out and purchases the customized paint, a cashier at the point-of sale system in the retail store may scan the customer's key FOB such that the point-of-sale system receives information from the key FOB usable to identify an online account corresponding to the consumer. As another example, a customer may provide information such as a name, address, and/or telephone number that may be usable to identify a customer account.

Once the account identifier is received at the second location in the retail store 140, the method 100 proceeds to block 150. In block 150, the customized product is associated with the online account of the consumer. For example, if the consumer purchases a customized paint color, then the unique product identifier associated with the customized paint color may be associated with the online account associated with the consumer account identifier.

Once the customized product is associated with the online account according to block 150, the method 100 proceeds to block 160. In block 160, the customized product can be associated with an object associated with the online account. For example, a consumer may be able to access the online account through a website associated with the retailer from which the customized product was purchased. In this embodiment, once the consumer uses an electronic device—such as a desktop computer, laptop computer, tablet computer, or a web-enabled mobile device—to navigate to the retailer's website and enters information to identify the online account associated with the consumer (e.g., a username and password), the consumer may be allowed to create and/or modify objects associated with the online account. For example, the consumer can create or modify a room, floor plan, building, and/or other object(s) associated with the online account. The consumer can further associate the purchased, customized product that is already associated with the online account with one or more object(s) that are also associated with the online account. For example, if the consumer's online account contains a first room, then the consumer can associate the customized paint color purchased in the retail location with the first room in the online account. In this way, the consumer can associate products purchased from a retail location with one or more objects in the consumer's online account.

These illustrative examples are given to introduce the reader to the general subject matter discussed herein and are not intended to limit the scope of the disclosed concepts. The following sections describe various additional embodiments and examples with reference to the drawings in which like numerals indicate like elements. Other embodiments will readily suggest themselves to such skilled persons having the benefit of this disclosure. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Electronic Device

Figure 2:
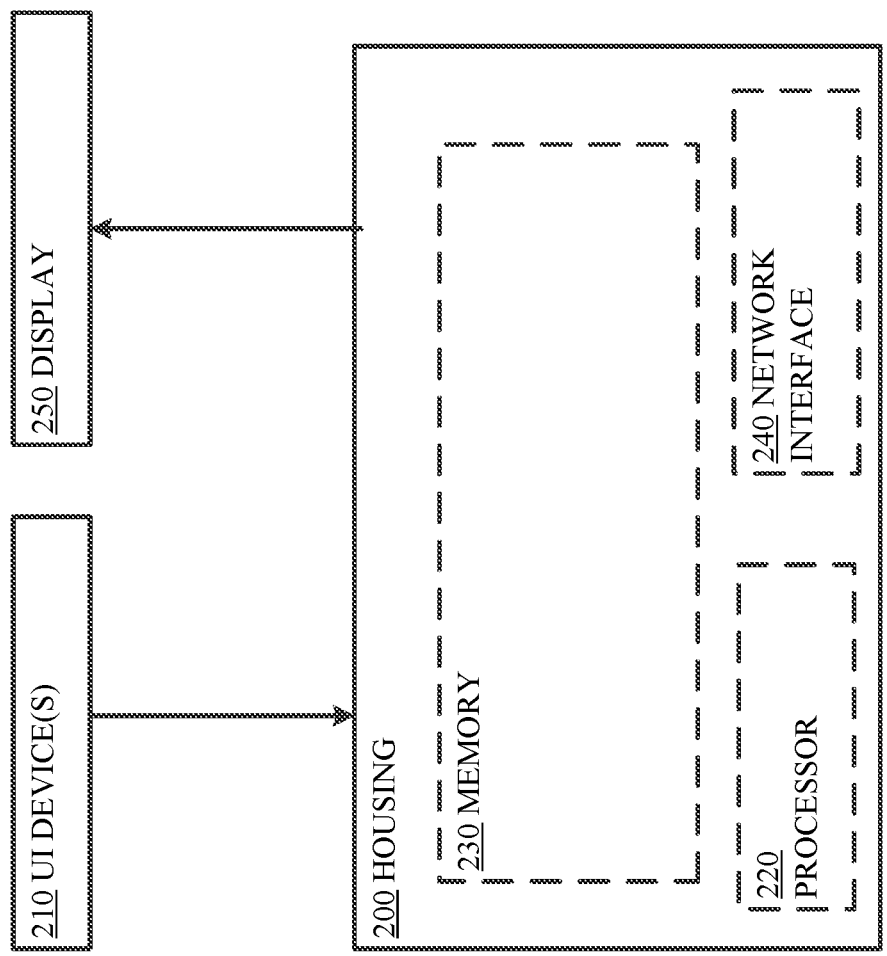
FIG. 2 is a block diagram depicting an exemplary electronic device according to an embodiment.

FIG. 2 is a block diagram depicting an exemplary electronic device according to an embodiment. For example, in one embodiment, electronic device 200 is a point-of-sale system. In other embodiments, electronic device 200 can be a mobile phone, a personal digital assistant (PDA), a laptop, a desktop computer, a tablet computer, a product customization station, a unique product identifier creator, or another suitable computing device. An electronic device may include additional or fewer components than the electronic device 200 shown in FIG. 2. For example, in an embodiment, an electronic device comprises the memory 230, the processor 220, the network interface 240, and the display 250. In this embodiment, the electronic device 200 may be in communication with one or more user interface devices 210. As another example, in one embodiment, the electronic device 200 does not comprise a network interface 240. Numerous configurations having fewer or additional components for the electronic device 200 are within the scope of this disclosure.

As shown in FIG. 2, the electronic device 200 comprises a computer-readable medium 210, such as a random access memory (RAM), coupled to a processor 220 that executes computer-executable program instructions and/or accesses information stored in memory 230. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, SRAM, DRAM, CAM, DDR, flash memory such as NAND flash or NOR flash, an ASIC, a configured processor, optical storage, magnetic tape or other magnetic storage, or any other medium from which a computer processor can read instructions. In one embodiment, the electronic device 200 may comprise a single type of computer-readable medium such as random access memory (RAM). In other embodiments, the electronic device 200 may comprise two or more types of computer-readable medium such as random access memory (RAM), a disk drive, and cache. The electronic device 200 may be in communication with one or more external computer-readable mediums such as an external hard disk drive or an external DVD drive.

The embodiment shown in FIG. 2, comprises a processor 220 which executes computer-executable program instructions and/or accesses information stored in memory 230. The instructions may comprise processor-specific instructions generated by a compiler and/or an interpreter from code written in any suitable computer-programming language including, for example, C, C++, C#, Visual Basic, Java, Python, Perl, JavaScript, and ActionScript®. In an embodiment, the electronic device 200 comprises a single processor 220. In other embodiments, the electronic device 200 comprises two or more processors.

The electronic device 200 as shown in FIG. 2 comprises a network interface 240 for communicating via wired or wireless communication. For example, the network interface 240 may allow for communication over networks via Ethernet, IEEE 802.11 (Wi-Fi), 802.16 (Wi-Max), Bluetooth, infrared, etc. As another example, network interface 240 may allow for communication over networks such as CDMA, GSM, UMTS, or other cellular communication networks. The electronic device 200 may comprise two or more network interfaces 240 for communication over one or more networks.

The electronic device 200 may comprise or be in communication with a number of external or internal devices such as a mouse, a trackpad, CD-ROM, a DVD, a keyboard, a display, a barcode scanner, an FOB reader, an RFID reader, audio speakers, one or more microphones, or any other input or output devices. For example, the electronic device 200 shown in FIG. 2 comprises a display 250 and is in communication with various user interface (UI) devices 210. Display 250 may use any suitable technology including, but not limited to, LCD, LED, CRT, and the like. In one embodiment, the display 250 is a touch-sensitive display. In other embodiments, the display 250 is not touch-sensitive.

Electronic device 200 may be a point-of-sale system, a tablet computer, a personal computing device, a personal digital assistant, a mobile phone, a desktop computer, a laptop computer, a product customization station, a unique product identifier creator or any other electronic device suitable for providing one or more of the features described herein.

Illustrative System

Figure 3:
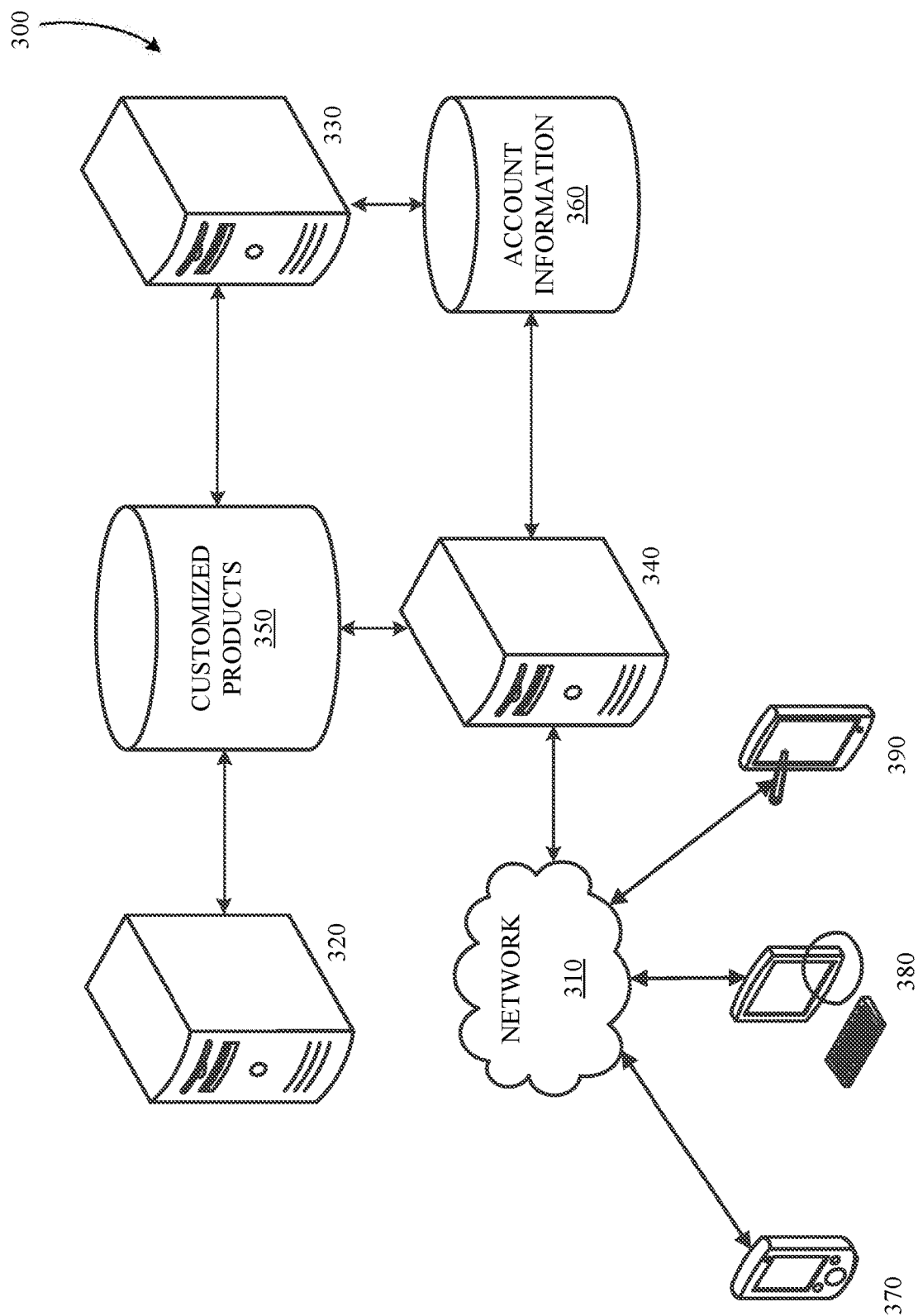
FIG. 3 is a system diagram depicting exemplary computing devices in an exemplary computing environment according to an embodiment.

FIG. 3 illustrates a system diagram depicting exemplary computing devices in an exemplary computing environment according to an embodiment. The system 300 shown in FIG. 3 includes three electronic client devices, 370-390, a web server 340, a point-of-sale system 330, and a product customization station 320. Each of the electronic client devices, 370-390, and the web server 340 are connected to a network 310. In this embodiment, each of the electronic client devices, 370-390, is in communication with the web server 340 through the network 310. Thus, each of the electronic client devices, 370-390, can send requests to the web server 340 and receive responses from the web server 340 through the network 310.

A network can facilitate communications between any number of devices. In the embodiment shown in FIG. 3, the network 310 facilitates communications between the electronic client devices 370-390 and the web server 340. In other embodiments, the network 310 may facilitate communications between other devices such as the product customization station 320, the point-of-sale-system 330, customized products data store 350, account information data store 360, and/or other devices. The network 310 may be any suitable number or type of networks or links, including, but not limited to, a dial-in network, a local area network (LAN), wide area network (WAN), public switched telephone network (PSTN), the Internet, an intranet or any combination of hard-wired and/or wireless communication links. In one embodiment, the network 310 may be a single network. In other embodiments, the network 310 may comprise two or more networks. For example, the electronic client devices 370-390 may be connected to a first network and the web server 340 may be connected to a second network. The first and the second network may be connected or otherwise in communication with each other. As another example, the product customization station 320 and point-of-sale system 330 may be in communication with a first network and the web server 340 and electronic client devices, 370-390, may be in communication with a second network. In another embodiment, product customization station 320 is in communication with a first network, point-of-sale system 330 is in communication with a second network, and web server 340 and electronic client devices, 370-390, are in communication with a third network. Numerous other network configurations are disclosed herein and others are within the scope of this disclosure.

One or more devices may be capable of communicating with one or more networks, such as network 310 and/or other networks, and be capable of sending and receiving information to and from another device, such as web server 340. For example, in FIG. 3, one device may be a tablet computer 390. The tablet computer 390 may include a touch-sensitive display and be able to communicate with the network 310 by using a wireless network interface card. The tablet computer 390 may or may not be in communication with network 310 according to various embodiments. Another device shown in FIG. 3 is a desktop computer 380. The desktop computer 380 may be in communication with a display and be able to connect to the network 310 through a wired network connection. The desktop computer 380 may be in communication with any number of input devices such as a keyboard or a mouse. In FIG. 3, a mobile phone 370 may be a device. The mobile phone 370 may be able to communicate with the network 310 over a wireless communications means such as TDMA, CDMA, GSM, or WiFi. Numerous other embodiments are disclosed herein and others are within the scope of this disclosure.

A device receiving a request from another device may be any device capable of communicating with a network, such as network 310, and capable of sending and receiving information to and from another device. For example, in the embodiment shown in FIG. 3, the web server 340 may be a device receiving a request from another device (e.g., electronic client devices 370-390) and may be in communication with network 310. A receiving device may be in communication with one or more additional devices, such as additional servers. For example, web server 340 in FIG. 3 may be in communication with one or more other servers that store information and/or are in communication with one or more data stores. In various embodiments, one or more data stores comprise information related to consumer accounts, web pages, scripts, products for purchase, purchased products, customizable products, customized products, customization parameters (e.g., paint colors or color formulas), purchase history, one or more objects, and/or other information. In an embodiment, a web server may communicate with one or more additional devices to process a request received from an electronic device. For example, web server 340 in FIG. 3 may be in communication with a plurality of additional servers, at least one of which may be used to process at least a portion of a request received from any of the electronic client devices 370-390 and/or other devices.

The embodiment shown in FIG. 3 comprises a product customization station 320. In one embodiment, the product customization station 320 is a device or collection of devices that enables a customized product to be ordered and/or a unique product identifier associated with a customized product to be created, and/or enables customization of the product. In one embodiment, the product customization station 320 is a standalone device. For example, the product customization station 320 may be a customized paint ordering and/or color mixing device. In other embodiments, the product customization station 320 is incorporated into or otherwise performed by one or more other devices, such as a desktop computer and/or a point-of-sale system. For example, the point-of-sale system 330 may perform one or more of the functions of the product customization station 320 as disclosed herein.

A product customization station 320 may comprise one or more devices configured to enable a customized product to be ordered and/or a unique product identifier associated with a customized product to be created and/or maintained. In some embodiments, the product customization station 320 is an electronic device, such as electronic device 200 shown in FIG. 2. The product customization station 320 may receive information corresponding to a base product and/or customization parameters from one or more input devices within the product customization station 320 and/or otherwise in communication with the product customization station 320. For example, in one embodiment, the customized product is a customized paint color (i.e., a paint that has been customized to exhibit a particular color) and the product customization station 320 receives a base paint color and customization parameters—such as a desired paint color, information usable to identify a desired paint color, a tint, and/or other customization parameters—that are usable to identify and/or create the customized paint color. In other embodiments, base products can include any number of products including but not limited to blinds, windows, doors, flooring, fabrics, moldings, chains, lumber, wire, and/or other base products. In various embodiments, customization parameters can include, but are not limited to, information such as sizes, lengths, widths, depths, heights, other dimensions, materials, patterns, colors, shades, shapes, and/or other customization parameters.

Product customization station 320 may be in communication with one or more networks, one or more data stores, and/or other devices. For example, in the embodiment shown in FIG. 3, product customization station 320 is in communication with customized products data store 350. In other embodiments, product customization station 320 is in communication with other data stores, such as account information data store 360 shown in FIG. 3, other electronic devices, such as point-of-sale system 330, and/or one or more networks, such as network 310. Numerous other embodiments are disclosed herein and others are within the scope of this disclosure.

The embodiment shown in FIG. 3 comprises a point-of-sale system 330. In one embodiment, the point-of-sale system 330 is a device or collection of devices that enables products to be purchased. In an embodiment, the point-of-sale system 330 is a standalone device. In other embodiments, the point-of-sale system 330 is incorporated into or otherwise performed by one or more other devices, such as a desktop computer and/or the product customization station 320. For example, the product customization station 320 may perform one or more of the functions of the point-of-sale system 330 as disclosed herein.

Point-of-sale system 330 may comprise one or more devices configured to enable products to be purchased by a consumer. For example, point-of-sale system 330 may be a cash register used to scan products that a consumer wants to purchase and enables the consumer to pay for the products. In other embodiments, point-of-sale system 330 is a self-checkout device, hand-held device, one or more applications, and/or another device that enables products to be purchased. In one embodiment, the point-of-sale system 330 is an electronic device, such as electronic device 200 shown in FIG. 2. In some embodiments, the point-of-sale system 330 comprises or is otherwise in communication with one or more output devices, such as a monitor or a printer, and one or more input devices—such as a keyboard, mouse, track pad, and/or touchscreen display. The point-of-sale system 330 may comprise or otherwise be in communication with a scanner. For example, the scanner may be used to read one or more QR codes, UPC codes, RFIDs, and/or other machine-readable codes.

Point-of-sale system 330 may be in communication with one or more networks, one or more data stores, and/or other devices. For example, in the embodiment shown in FIG. 3, point-of-sale system 330 is in communication with customized products data store 350 and account information data store 360. In other embodiments, point-of-sale system 330 is in communication with fewer or additional data stores. The point-of-sale system 330 may be in communication with one or more networks, such as network 310. Numerous other embodiments are disclosed herein and others are within the scope of this disclosure.

One or more devices may be in communication with a data store. For example, in FIG. 3, web server 340 is in communication with data store 350 and data store 360. In some embodiments, data store 350 and/or data store 360 is operable to receive instructions from web server 340 and/or other devices in communication with data store 350 and/or data store 360 and obtain, update, or otherwise process data in response to receiving the instructions. In one embodiment, data store 350 is separate from data store 360. In other embodiments, data store 350 and data store 360 is the same data store. In some embodiments, fewer or additional data stores may be used.

In the embodiment shown in FIG. 3, customized products data store 350 may contain information related to customizable products and/or customized products. For example, data store 350 may contain information representing base products and/or customization information. In one embodiment, data store 350 contains information corresponding to customizable paints and/or customized paints. For example, data store 350 may contain unique product identifiers, base paint colors, paint color formulas, tints, additional color(s) and/or amounts of color(s) to add to a base paint color, and/or other information. In some embodiments, data store 350 contains information corresponding to other customizable products and/or customized products. For example, data store 350 may contain information corresponding to doors, windows, moldings, blinds, chains, lumber, wire, and/or other customizable products and/or customized products. Data store 350 may contain information that can be used to customize a product. For example, in one embodiment, data store 350 contains information such as customizable dimensions, previously customized dimensions, colors, amounts, quantities, lengths, widths, heights, depths, other sizes, designs, patterns, and/or other customization information. In some embodiments, customized products data store 350 contains product descriptions, product sales price, product cost, discount information, and/or other information associated with one or more products. Numerous other embodiments are disclosed herein and others are within the scope of this disclosure.

The embodiment shown in FIG. 3 comprises an account information data store 360. Data store 360 may contain information associated with online accounts, objects, purchase history, and/or other information. For example, data store 360 may comprise consumer information, names, addresses, billing information, payment methods, phone numbers, information about previous online purchases (with or without customization information about some or all of the previously purchased items), information about previous in-store purchases (with or without customization information about some or all of the previously purchased items), transaction information, pricing information, product descriptions, and/or other information associated with an online account, products, and/or purchases. In one embodiment, data store 360 comprises information for one or more objects. For example, data store 360 may comprise objects associated with a building, floor plan, materials, items within a building, and/or other objects. Such objects can include, but are not limited to, walls, windows, doors, door opening, wall openings, the land on which a building is constructed, and/or other objects. Numerous other embodiments are disclosed herein and others are within the scope of this disclosure.

Data store 350 and/or data store 360 shown in FIG. 3 may receive requests from web server 340 and send responses to web server 340. For example, in one embodiment, web server 340 requests information related to a specific online account. For example, the web server 340 may request a list of objects associated with an online account. As another example, the web server 340 may request previous purchase information associated with a particular online account. In this embodiment, previous purchase history information for the particular online account can include only online purchases, only in-store purchases, or a combination of online and in-store purchases. In response to receiving a request, data store 350 and/or data store 360 may send the requested information about the customized product and/or account information to the requesting electronic device. For example, if web server 340 sends a request to data store 350, then data store 350 may send a response to the web server 340 where the response includes the requested information.

In some embodiments, data store 350 and/or data store 360 can send, receive, add, update, delete, and/or otherwise manipulate information based at least in part on one or more requests received from an electronic device. For example, in one embodiment, web server 340 may receive a request to associate an item purchased in a retail-location associated with an online account with an object that is associated with the online account. In this embodiment, data store 350 and/or data store 360 may receive the request and, in response, update the information in one or more data stores to specify that the object is associated with the purchased item. As another example, in various embodiments, web server 340 may query data store 350 and/or data store 360 to determine one or more objects corresponding to a particular online account and one or more products that is associated with the object(s) associated with the online account. Numerous other embodiments are disclosed herein and others are within the scope of this disclosure.

The embodiment shown in FIG. 3 is an illustrative system according to one embodiment of the present invention. In other embodiments, fewer or additional electronic devices, networks, and/or data stores may be used according to various systems. For example, the point-of-sale system 330 and/or product customization station 320 may access data store 350 and/or data store 360 through the network 310 and/or one or more other networks. In other embodiments, electronic devices 370-390 may interact with product customization station 320 through network 310. For example, product customization station 320 may allow users to create customized products through mobile devices. Numerous other embodiments are disclosed herein and others are within the scope of this disclosure.

Illustrative Method for Associating Customized Product with a Unique Identifier

Figure 4:
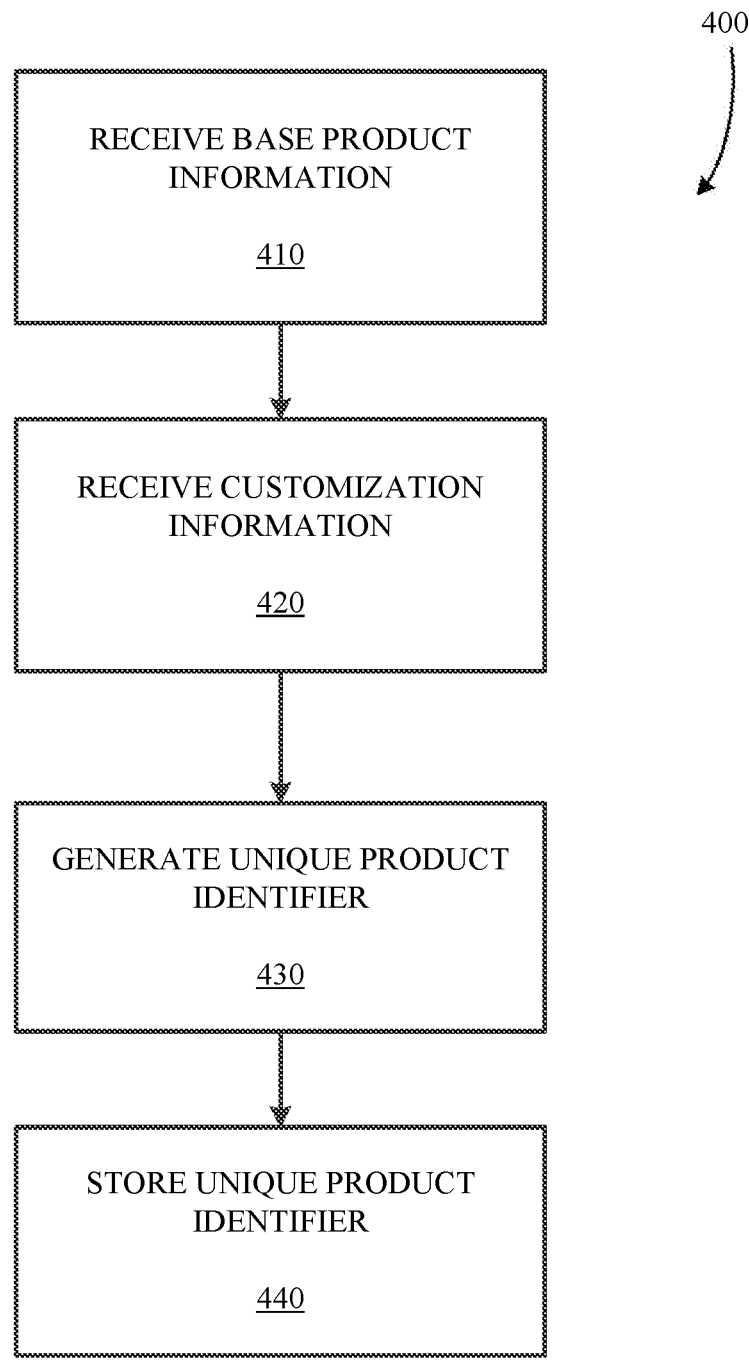
FIG. 4 is a flow chart illustrating a method of assigning a unique product identifier to a customized product.

Referring now to FIG. 4, FIG. 4 is a flow chart illustrating one exemplary method 400 of associating a unique product identifier with a customized product. The description of method 400 of FIG. 4 will be made with respect to FIG. 3 according to an embodiment. The description of method 400 will also be made with respect to electronic device 200 in FIG. 2 according to an embodiment.

The method 400 shown in FIG. 4 begins when base product information is received 410. For example, referring to FIG. 3, product customization station 320 may receive base product information through an input device within the product customization station 320 or otherwise in communication with the product customization station 320. In other embodiments, base product information is received by any number of devices such as point-of-sale system 330, web server 340, and/or another electronic device. In some embodiments, base product information is received through one or more networks such as network 310 in FIG. 3. In an embodiment, base product information is received by one or more electronic devices, such as electronic device 200 shown in FIG. 2.

Base product information may be received through one or more input devices. For example, referring to FIG. 3, product customization station 320 may receive a base product identifier through an input device associated with the product customization station 320. In this embodiment, the product customization station 320 may send a request to customized products data store 350 requesting information for a base product associated with the base product identifier. In response to the request, customized products data store 350 may send and the product customization station 320 may receive information corresponding to the base product associated with the base product identifier. In another embodiment, the product customization station may send a request to customized products data store 350 requesting a base product identifier associated with information, such as a product name and/or a product description, sent in the request. In this embodiment, customized products data store 350 can send and the product customization station 320 can receive the base product identifier.

In various embodiments, the product customization station 320 includes a scanning input device that enables a QR code, UPC code, FOB, RFID, and/or other base product information to be received by the product customization station 320. In other embodiments, information usable to identify a base product, such as a unique product identifier, may be received by the product customization station 320 from another input device, such as a keyboard or mouse. Base product information can include information usable to identify one or more base products and/or information about one or more base products. For example, base product information can include a base product identifier such as a QR code, UPC code, RFID, and/or other base product information usable to identify a base product identifier. In an embodiment where a base product identifier is received by the product customization station 320, the base product identifier can be used to obtain additional information regarding a base product corresponding to the base product identifier. For example, product customization station 320 may query a data store with a base product identifier and receive a response from the data store with information regarding the base product corresponding to the base product identifier. In embodiments, such information can include a name, description, retail price, discounted price, cost, margin, location, tax, quantity, associated products, customization options, and/or other information associated with a base product.

In one embodiment, base product information includes information to a particular non-customized product. For example, a base product may be determined and/or otherwise selected from preexisting products. Exemplary examples of base products include, but are not limited to, paints, doors, moldings, windows, blinds, curtains, chains, lumber, wire, and/or other products capable of being customized. In another embodiment, base product information includes a previously-customized product. In this embodiment, the previously-customized product may be further customized. For example, a previously customized paint color may be selected as a base paint color that can be further customized by adding additional colors and quantities of paint. Numerous other embodiments are disclosed herein and variations are within the scope of this disclosure.

Referring back to FIG. 4, after receiving base product information 410, the method 400 proceeds to block 420. In block 420, customization information is received. For example, referring to FIG. 3, product customization station 320 may receive customization information through an input device within the product customization station 320 or otherwise in communication with the product customization station 320. In other embodiments, customization information is received by any number of devices such as point-of-sale system 330, web server 340, and/or another electronic device. In some embodiments, customization information is received through one or more networks such as network 310 in FIG. 3. In an embodiment, customization information is received by one or more electronic devices, such as electronic device 200 shown in FIG. 2.

Customization information may be received through one or more input devices. For example, customization information may be received by the product customization station 320 through an input device associated with the product customization station 320. In an embodiment, the received customization information includes a customization identifier. In this embodiment, the product customization station 320 may send a request to the customized products data store 350 requesting customization information corresponding to the customization identifier. In response to the request, the customized products data store 350 may send and the product customization station 320 may receive customization information corresponding to the customization identifier. In various embodiments, the product customization station 320 includes a scanning input device that enables a QR code, UPC code, FOB, RFID, and/or other customization information to be received by the product customization station 320. In other embodiments, information usable to identify one or more customization options, such as a unique customization identifier, may be received by the product customization station 320 from another input device, such as a keyboard or mouse.

Customization information can include information usable to identify one or more additions, deletions, and/or alterations to one or more base products. For example, if the base product is a particular paint, then the customization information can include one or more colors and quantities that should be added to the particular base paint to create a customized paint color. As another example, in one embodiment, the customization information includes a particular color of paint that is wanted and the product customization station 320 can determine which paint color(s) and quantities should be added to a base paint to achieve the particular color of paint. In various embodiments, customization information can include information such as sizes, lengths, widths, depths, heights, other dimensions, materials, patterns, shades, shapes, and/or other customization parameters. In other embodiments, customization information can include any information usable to remove one or more features of a base product, add one or more features to a base product, and/or otherwise alter a base product.

One or more data stores may contain base product information and/or customization information. For example, customized products data store 350 may contain available customization options for a particular base product. In one embodiment, the customized products data store 350 includes potential sizes, lengths, widths, depths, heights, other dimensions, materials, patterns, shades, shapes, and/or other customization parameters for one or more base products. In some embodiments, the customized products data store 350 includes designs, fabrics, colors, and/or other features that can be applied to one or more base products. In one embodiment, the customized products data store 350 includes information for one or more base products that have previously been customized. For example, the customized products data store 350 may include a unique customized product identifier that is associated with a particular base product and one or more customization parameters. Numerous other embodiments are disclosed herein and variations are within the scope of this disclosure.

Referring back to FIG. 4, once the customization information is received 420, the method 400 proceeds to block 430. In block 430, a unique product identifier is generated. For example, referring to FIG. 3, a unique product identifier may be generated by the product customization station 320. In other embodiments, the unique product identifier is generated by any number of devices such as point-of-sale system 330, web server 340, customized products data store 350, and/or another device or data store. In an embodiment, a unique product identifier is generated by one or more electronic devices, such as electronic device 200 shown in FIG. 2.

A unique product identifier can include any information usable to identify a customized product. For example, the unique product identifier may be an incremental counter such that each customized product corresponds to a unique number, letter, or combination thereof. In other embodiments, the unique product identifier may be a unique identifier generated from a timestamp, date, time, order number, transaction number, base product information, customization information, consumer information, sales location, retail location identifier, store identifier, employee identifier, other information, or a combination thereof. In one embodiment, the unique product identifier is associated with a base product, customization information, and/or other information for a customized product. For example, a unique product identifier may be associated with a particular customized paint color. In this embodiment, the unique product identifier may be associated with a particular base paint color as well as customization information such as colors and quantities of other paint colors to be added to the particular base paint color to create a customized paint color. In some embodiments, the unique product identifier may include two or more separate parts. One part, for example, may be indicative of the base product and another part may be indicative of the customization(s). In such embodiments, the first part (e.g., a QR code and/or a UPC code) can be affixed to all base products that have the same characteristics, and the second part can be affixed separately (or otherwise added) to the base product after customization of the base product. The unique product identifier can be associated with other information including, but not limited to, retail prices, costs, discounts, product descriptions, product titles, and/or other information. Numerous additional embodiments are disclosed herein and variations are within the scope of this disclosure.

In some embodiments, one or more devices generates a human and/or machine readable code associated with the unique product identifier. For example, the product customization station 320 may create a QR code and/or a UPC code that comprises the unique product identifier. In this embodiment, the QR code and/or UPC code may be printed and physically affixed to a customized product. For example, if the customized product is a customized paint color, then the printed QR code and/or UPC code may be affixed to a paint can containing the customized paint color. In some embodiments, one or more devices can scan the code to determine information associated with the unique product identifier. For example, the code may be scanned at point-of-sale system 330 to determine a price, description, and/or other information for a customized product associated with the unique product identifier. In some embodiments that utilize a multi-part unique product identifier (for example, as described above), the scanning system (e.g., the point-of-sale system 330) can be configured to scan or otherwise receive the first part of the unique product identifier (e.g., a QR code and/or UPC code), and upon determining that the corresponding base product is eligible for customization, prompt the scan operator and/or the scanning system to scan the other part(s) of the unique product identifier (e.g., the part(s) indicative of the customization).

Referring back to FIG. 4, after generating unique product identifier 430, the method 400 proceeds to block 440. In block 440, the unique product identifier is stored. For example, referring to FIG. 3, the unique product identifier and/or information associated with the unique product identifier may be stored in customized products data store 350.

A unique product identifier and/or information associated with a unique product identifier may be stored in any number of devices. For example, a unique product identifier and/or information associated with a unique product identifier can be stored in a data store, such as customized products data store 350 and/or account information data store 360. In other embodiments, a unique product identifier and/or information associated with a unique product identifier is stored in product customization station 320, point-of-sale system 330, web server 340, one or more client devices 370-390, one or more data stores, and/or other devices. In an embodiment, a unique product identifier and/or information associated with a unique product identifier is stored in one or more storage mediums, such as memory 230, of the electronic device 200 shown in FIG. 2.

In one embodiment, a unique product identifier includes information usable to identify a base product, one or more customization parameters, and/or a customized product. For example, a unique product identifier may be associated with a base product identifier for a base product. In other embodiments, a unique product identifier is associated with a base product name, description, retail price, discounted price, cost, margin, location, tax, quantity, other associated products, customization options, and/or other information associated with a base product and/or customization parameters. As another example, a unique product identifier can be associated with one or more sizes, lengths, widths, depths, heights, other dimensions, materials, patterns, shades, shapes, and/or other customization parameters selected for one or more base products and/or available for one or more base products.

Illustrative Method for Associating a Customized Product with an Online Account

Figure 5:
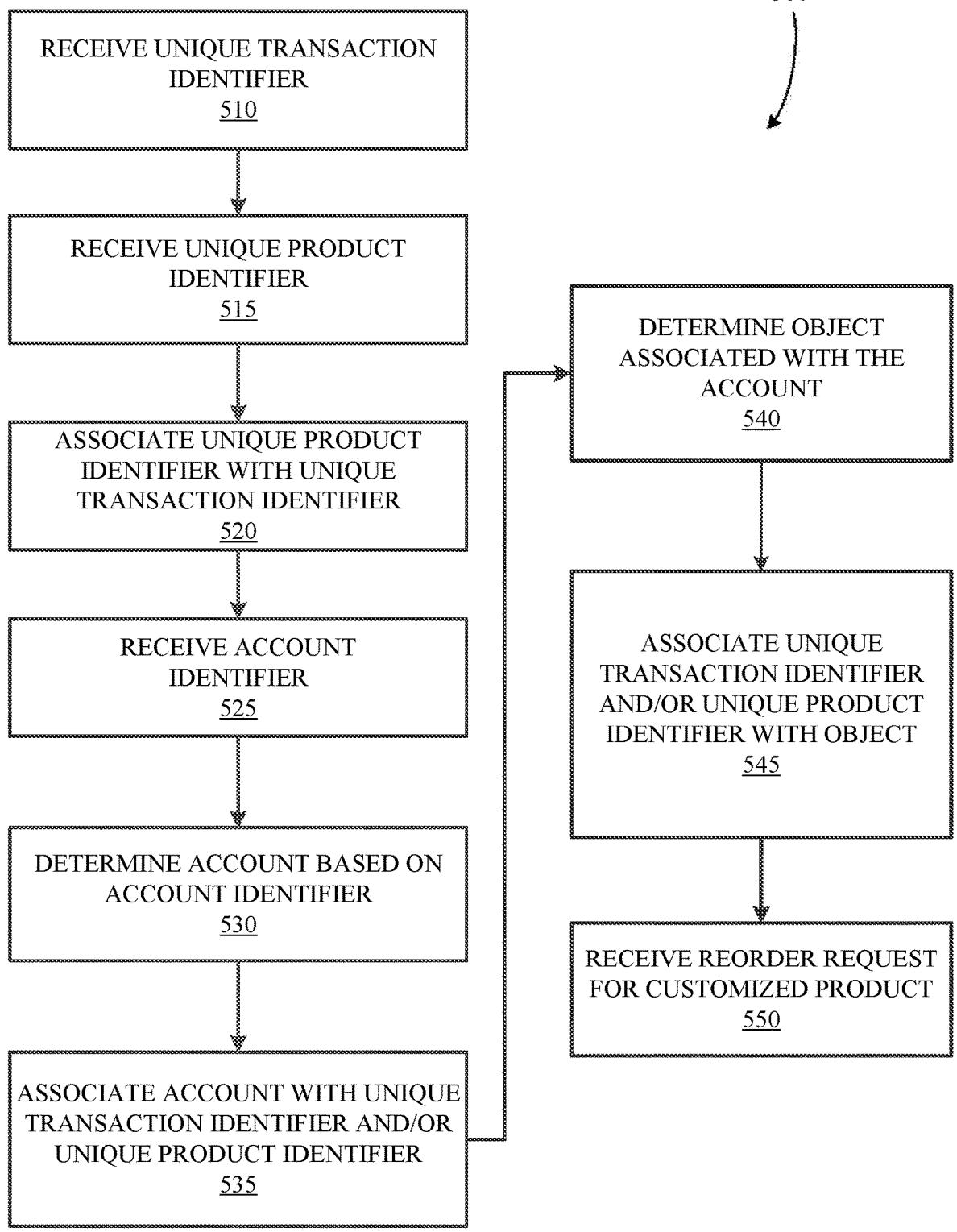
FIG. 5 is a flow chart illustrating a method of assigning one or more customized products to an object associated with an online account.

Referring now to FIG. 5, FIG. 5 is a flow chart illustrating an exemplary method 500 of assigning one or more customized products to an object associated with an online account. The description of the method 500 of FIG. 5 will be made with respect to FIG. 3 according to an embodiment. The description of method 500 will also be made with respect to electronic device 200 in FIG. 2 according to an embodiment.

The method 500 shown in FIG. 5 begins when a unique transaction identifier is received 510. For example, referring to FIG. 3, a unique transaction identifier may be received by point-of-sale system 330. In one embodiment, a unique transaction identifier is received by point-of-sale system 330 from a data store, such as data store 350 and/or data store 360. In another embodiment, point-of-sale system 330 creates or otherwise generates a unique transaction identifier.

A unique transaction identifier may be received, created, and/or otherwise generated by any number of devices. For example, referring to FIG. 3, a unique transaction identifier can be created by account information data store 360. In other embodiments, a unique transaction identifier is received, created, and/or otherwise generated by data store 350, data store 360, product customization station 320, point-of-sale system 330, web server 340, and/or another electronic device. An electronic device—such as electronic device 200—receiving, creating, and/or otherwise generating the unique transaction identifier may send the unique transaction identifier to one or more data stores. For example, the electronic device may send the unique transaction identifier to account information data store 360 and/or customized products data store 350. The unique transaction identifier and/or other information corresponding to a transaction (e.g., an order for one or more customized and/or non-customized products)—such as products, unique product identifiers, prices, locations, quantities, account information, and/or other information associated with a transaction—may be stored in one or more data stores. For example, if account information data store 360 receives the unique transaction identifier, then data store 360 may store the unique transaction identifier and/or other information associated with a transaction.

In one embodiment, point-of-sale system 330 is in communication with customized products data store 350 and/or account information data store 360. In this embodiment, the point-of-sale system 330 can send a request to data store 350 and/or data store 360 for a unique transaction identifier. In response to receiving the request, data store 350 and/or data store 360 may generate the unique transaction identifier. The generated unique transaction identifier may be sent from data store 350 and/or data store 360 to the point-of-sale system 330. In another embodiment, web server 340 receives a unique transaction identifier. For example, web server 340 may receive a unique transaction identifier from point-of-sale system 330. As another example, web server 340 can receive a unique transaction identifier from an electronic client device, such as electronic client devices 370-390. Numerous other embodiments are disclosed herein and variations are within the scope of this disclosure.

A unique transaction identifier can be created or otherwise generated based at least in part on one or more sources of information. In one embodiment, a unique transaction identifier is based at least in part on an incremental counter. For example, data store 360 may comprise an incremental counter such that a unique transaction identifier is created for each order. In this embodiment, no two transaction identifiers in the data store are the same. In various embodiments, a unique transaction identifier may be created or otherwise generated based at least in part on a timestamp, date, time, order number, retail location, register identifier, employee identifier, online identifier, account information, one or more products purchased, payment type, payment method, total purchase price, product quantities, product cost, product price, other information, or a combination thereof. Numerous additional embodiments are disclosed herein and variations are within the scope of this disclosure.

In some embodiments, a unique transaction identifier corresponds to a purchase of at least one product. For example, a unique transaction identifier may correspond to one or more customized products purchased by a consumer at an in-store retail location. In one embodiment, a unique transaction identifier corresponds to only customized products. In another embodiment, a unique transaction identifier corresponds to only non-customized products. In other embodiments, a unique transaction identifier corresponds to both customized and non-customized products. A unique transaction identifier can correspond to one or more products purchased at an in-store location of a retailer. In other embodiments, a unique transaction identifier corresponds to one or more products purchased from a website associated with a retailer. In some embodiments, a unique transaction identifier corresponds to an online account of a consumer purchasing one or more customized and/or non-customized products. Numerous other embodiments are disclosed herein and variations are within the scope of this disclosure.

Referring back to FIG. 5, after receiving a unique transaction identifier 510, the method 500 proceeds to block 515. In block 515, a unique product identification is received. For example, referring to FIG. 3, a unique product identification may be received by product customization station 320. In one embodiment, a unique product identification is received by product customization station 320 from a data store, such as data store 350 and/or data store 360. In another embodiment, a unique product identifier is received by product customization station 320 from one or more input devices, such as a barcode scanner and/or a keyboard, associated with the product customization station 320.

A unique product identifier can be received by any number of devices. For example, a unique product identifier may be received by point-of-sale system 330. In one embodiment, point-of-sale system 330 receives a unique product identifier from an input device in communication with the point-of-sale system 330. For example, in one embodiment, the point-of-sale system 330 includes a scanning input device such as a barcode scanner. In this embodiment, the scanning input device enables QR codes, UPC codes, FOBs, RFIDs, and/or other information usable to identify a unique product identifier to be received by the point-of-sale system 330 and/or another electronic device. In other embodiments, information usable to identify a unique product identifier is received by point-of-sale system 330 from another input device, such as a keyboard and/or mouse. In one embodiment, a unique product identifier is received by web server 340. For example, web server 340 may receive a unique product identifier from an electronic client device such as electronic client device 370-390.

A unique product identifier may be received in response to a request sent by an electronic device to a data store. For example, point-of sale system 330 may receive information—such as a product name and/or a product description—usable to identify a unique product identifier. In this embodiment, the point-of-sale system 330 queries data store 350 and/or data store 360 with a request for a unique product identifier that corresponds with the product name, product description, and/or other product information. In response to sending the request to data store 350 and/or data store 360, point-of-sale system 330 can receive a response from data store 350 and/or data store 360 with the unique product identifier. Numerous other embodiments are disclosed herein and variations are within the scope of this disclosure.

A unique product identifier may be created, and/or otherwise generated by any number of devices. For example, referring to FIG. 3, a unique product identifier can be created by account information data store 360. In other embodiments, a unique product identifier is created and/or otherwise generated by data store 350, data store 360, product customization station 320, point-of-sale system 330, web server 340, and/or another electronic device. An electronic device—such as electronic device 200—creating, and/or otherwise generating the unique product identifier may send the unique product identifier to one or more data stores. For example, the electronic device may send the unique product identifier to account information data store 360 and/or customized products data store 350. The unique product identifier and/or other information corresponding to a product—such as names, descriptions, prices, costs, margins, locations, quantities, customization information, and/or other information associated with a product—may be stored in one or more data stores. For example, if account information data store 360 receives the unique product identifier, then data store 360 may store the unique product identifier and/or other information associated with a product.

In one embodiment, point-of-sale system 330 is in communication with customized products data store 350 and/or account information data store 360. In this embodiment, the point-of-sale system 330 can send a request to data store 350 and/or data store 360 for a unique product identifier. In response to receiving the request, data store 350 and/or data store 360 may generate the unique product identifier. The generated unique product identifier may be sent from data store 350 and/or data store 360 to the point-of-sale system 330. In another embodiment, web server 340 receives a unique product identifier. For example, web server 340 may receive a unique product identifier from point-of-sale system 330. As another example, web server 340 can receive a unique product identifier from an electronic client device, such as electronic client device 370-390. Numerous other embodiments are disclosed herein and variations are within the scope of this disclosure.

A unique product identifier can be created or otherwise generated based at least in part on one or more sources of information. In one embodiment, a unique product identifier is based at least in part on an incremental counter. For example, data store 360 may comprise an incremental counter such that a unique product identifier is created for each different product. In this embodiment, no two product identifiers in the data store are the same. In various embodiments, a unique product identifier may be created or otherwise generated based at least in part on a timestamp, date, time, order number, retail location, register identifier, employee identifier, online identifier, account information, one or more products purchased, product title, product description, product cost, payment type, payment method, total purchase price, product quantities, product cost, product price, other information, or a combination thereof. In embodiments, such other information can include, but is not limited to, a name, description, retail price, discounted price, cost, margin, location, tax, quantity, associated products, customization options, and/or other information associated with a base product. Numerous additional embodiments are disclosed herein and variations are within the scope of this disclosure.

In embodiments, a unique product identifier corresponds to at least one product. In one embodiment, the product is a customized product and the unique product identifier corresponds to the customized product. For example, a unique product identifier may correspond to one or more customized products ordered by a consumer at an in-store retail location. In one embodiment, a unique product identifier corresponds to a base product and customization information for the base product. In this embodiment, the base product and the customization information may be usable to create a customized product. In some embodiments, a unique product identifier corresponds to a single product. In other embodiments, a unique product identifier corresponds with two or more products. A unique product identifier may correspond with one or more customized products, one or more non-customized products, or a combination thereof. A unique product identifier can correspond to one or more products purchased at an in-store location of a retailer. In other embodiments, a unique product identifier corresponds to one or more products purchased from a website associated with a retailer. In some embodiments, a unique product identifier corresponds to an online account of a consumer purchasing one or more customized and/or non-customized products. In some embodiments, multiple unique product identifiers are received. For example, a unique product identifier may be received for each product ordered and/or being purchased at a point-of-sale system 330. Numerous other embodiments are disclosed herein and variations are within the scope of this disclosure.

Referring back to FIG. 5, after receiving the unique product identifier 515, the method 500 proceeds to block 520. In block 520, the unique product identifier is associated with the unique transaction identifier. For example, referring to FIG. 3, data store 360 may associate one or more unique product identifiers with a unique transaction identifier. In one embodiment, data store 360 associates one or more unique product identifiers with one or more unique transaction identifiers in response to receiving a request from point-of-sale system 330. For example, an order may comprise three products, each having a unique product identifier. In this embodiment, each of the three unique product identifiers may be associated with a unique transaction identifier. In this way, the unique transaction identifier may represent an order for one or more products. In another embodiment, data store 360 associates one or more unique product identifiers with one or more unique transaction identifiers in response to receiving a request from web server 340.

A request to associate one or more products with one or more transactions may be made and/or received by any number of devices. In one embodiment, a request to associate one or more products with one or more transactions is made and/or received by point-of-sale system 330. For example, point-of-sale system 330 may send a request to one or more data stores, such as data store 350 and/or data store 360. The request may include one or more transactions and one or more products that should be associated with the one or more transactions. In another embodiment, a request to associate one or more products with one or more transactions is made and/or received by web server 340 and/or one or more electronic client devices 370-390. For example, web server 340 may receive a request to associate one or more products with one or more transactions from tablet computer 390. In this embodiment, web server 340 may receive the request and send a request to a data store, such as data store 360, to associate the one or more products with the one or more transactions. In one embodiment, one or more products are associated with one or more transactions based at least in part on unique product identifiers for the one or more products and unique transaction identifiers for the one or more transactions. For example, data store 360 may store associations between unique transaction identifiers and unique product identifiers associated with the unique transaction identifiers. Numerous other embodiments are disclosed herein and variations are within the scope of this disclosure.

Referring back to FIG. 5, after associating the unique product identifier with the unique transaction identifier 520, the method 500 proceeds to block 525. In block 525, an account identifier is received. For example, referring to FIG. 3, point-of-sale system 330 may receive an account identifier from a key FOB through an input device, such as a scanner, associated with the point-of-sale system 330.

An account identifier can be sent by and/or received by any number of devices. In one embodiment, an account identifier is sent from a key FOB and/or a RFID and received by point-of-sale system 330. For example, point-of-sale system 330 may comprise or otherwise be in communication with a scanner that can receive information, such as an account identifier, from a QR code, UPC code, FOB, RFID and/or another device. In another embodiment, an account identifier is sent from an electronic client device, such as tablet computer 390, and received by web server 340 through network 310. In other embodiments, an account identifier can be sent by and/or received by product customization station 320, point-of-sale system 330, and/or one or more electronic client devices 370-390. In other embodiments, an account identifier can be sent by and/or received by one or more electronic devices, such as electronic device 200 shown in FIG. 2.

An account identifier can include information usable to identify a particular account. For example, an account identifier may include information usable to identify a particular online account associated with a consumer. In one embodiment, an account identifier includes a unique username and password combination that is usable to identify a particular account. In other embodiments, an account identifier comprises a username, a passphrase, a unique account identifier, answers for one or more security questions, a credit card number, other information usable to identify a particular account, or a combination thereof. Numerous other embodiments are disclosed herein and variations are within the scope of this disclosure.

Referring back to FIG. 5, after receiving an account identifier 525, the method 500 proceeds to block 530. In block 530, an account is determined based at least in part on the account identifier 530. For example, referring to FIG. 3, point-of-sale system 330 may determine an account by querying data store 360 with at least the account identifier. In one embodiment, the account corresponds with an online account of a consumer. As another example, web server 340 may determine an account by querying a data store, such as data store 350 and/or data store 360, with at least the account identifier. In this embodiment, web server 340 can receive a request from an electronic client device, such as electronic client device 370-390, through network 310. The request may include the account identifier and the web server 340 may determine an account associated with the first account identifier by querying data store 360 with the account identifier. For example, if the account identifier comprises a username and a password, then the web server 340 may query data store 360 to determine if an account associated with the username and password exists. In other embodiments, an account corresponding to an account identifier may be requested by, received by, and/or determined by any number of devices such as electronic client devices 370-390, web server 340, point-of-sale system 330, and/or product customization station 320. In some embodiments, an account corresponding to an account identifier may be requested by, received by, and/or determined by a data store, such as data store 350 and/or data store 360. In other embodiments, an account corresponding to an account identifier may be requested by, received by and/or determined by one or more electronic devices, such as electronic device 200 shown in FIG. 2. Numerous other embodiments are disclosed herein and variations are within the scope of this disclosure.

Referring back to FIG. 5, after determining an account based at least in part on the account identifier 530, the method 500 proceeds to block 535. In block 535, the account is associated with the unique transaction identifier and/or one or more unique product identifiers. For example, referring to FIG. 3, data store 360 may associate one or more unique transaction identifiers and/or one or more unique product identifiers with the account. In one embodiment, data store 360 associates one or more unique transaction identifiers and/or one or more unique product identifiers with an account in response to receiving a request from another device, such as web server 340, point-of-sale system 330, product customization station 320, and/or an electronic client device 370-390. For example, an order may comprise a first product corresponding to a first unique product identifier and a second product corresponding to a second unique product identifier. In this embodiment, both the first product and the second product can be associated with a unique transaction identifier corresponding to the order. For example, the first unique product identifier and the second unique product identifier may be associated with the unique transaction identifier. In this embodiment, the first unique product identifier, the second unique product identifier, and/or the unique transaction identifier can be associated with the account. For example, the first unique product identifier, the second unique product identifier, and/or the unique transaction identifier may be associated with a unique account identifier corresponding to the account. In this way, consumer purchases may be viewed in an online account based at least in part on the unique transaction identifiers for various orders and/or unique product identifiers for various products. The unique product identifiers may correspond to customized products, non-customized products, or a combination thereof.

A request to associate one or more products and/or one or more transactions with an account may be made and/or received by any number of devices. In one embodiment, a request to associate one or more products and/or one or more transactions with an account is made and/or received by point-of-sale system 330. For example, point-of-sale system 330 may send a request to one or more data stores, such as data store 350 and/or data store 360. The request may include one or more transactions and/or one or more products that should be associated with the account. In another embodiment, a request to associate one or more products and/or one or more transactions with an account is made and/or received by web server 340 and/or one or more electronic client devices 370-390. For example, web server 340 may receive a request to associate one or more products and/or one or more transactions with an account from tablet computer 390. In this embodiment, web server 340 may receive the request and send another request to a data store, such as data store 360, to associate the one or more products and/or the one or more transactions with the account. In one embodiment, one or more products and/or one or more transactions are associated with an account based at least in part on unique product identifiers for the one or more products and/or unique transaction identifiers for the one or more transactions. For example, data store 360 may store associations between unique transaction identifiers and/or unique product identifiers with the account. Numerous other embodiments are disclosed herein and variations are within the scope of this disclosure.

Referring back to FIG. 5, after associating the account with a transaction identifier and/or one or more unique product identifiers 535, the method 500 proceeds to block 540. In block 540, an object associated with the account is determined. For example, referring to FIG. 3, web server 340 may determine an object associated with the account by querying a data store, such as data store 360, for one or more objects associated with the account. In one embodiment, web server 340 receives a request from an electronic client device, such as electronic client device 370-390. In this embodiment, the request includes a selection of one or more objects associated with the account that should be associated with one or more transaction identifiers and/or one or more unique product identifiers. In this embodiment, one or more objects associated with the account that should be associated with one or more transactions and/or one or more products is based at least in part on the selection of the one or more objects received in the request. In other embodiments, one or more objects may be determined by any number of devices such as electronic client devices 370-390, web server 340, point-of-sale system 330, and/or product customization station 320. In some embodiments, one or more objects can be determined by a data store, such as data store 350 and/or data store 360. In other embodiments, one or more objects may be determined by one or more electronic devices, such as electronic device 200 shown in FIG. 2. Numerous other embodiments are disclosed herein and variations are within the scope of this disclosure.

An object may include a representation of an item associated with a building. For example, objects can include, but are not limited to: walls, portions of walls, railings, moldings, doorways, floor plans, the land on which the building sits, windows, openings, and/or rooms. In some embodiments, an object may be associated with one or more dimensions. For example, if an object is a wall, then the wall may be associated with a length, width, height, and/or thickness. An object may comprise or otherwise be associated with one or more other objects. For example, if an object is a room, then the room may be associated with four wall objects that form the room. In some embodiments, an object corresponds to a unique object identifier. For example, data store 360 may store a unique object identifier that corresponds to a particular wall having a particular length, width, height, and/or thickness. As another example, data store 360 may contain a unique object identifier corresponding to a particular room. In this embodiment, the unique object identifier for the particular room may be associated with unique object identifiers for walls that form the room. Numerous other embodiments are disclosed herein and variations are within the scope of this disclosure.

Referring back to FIG. 5, after determining an object associated with the account 540, the method 500 proceeds to block 545. In block 545, one or more unique transaction identifiers and/or one or more unique product identifiers are associated with one or more objects.

For example, referring to FIG. 3, data store 360 may associate one or more unique transaction identifiers and/or one or more unique product identifiers with one or more objects associated with the account. In one embodiment, data store 360 associates one or more unique transaction identifiers and/or one or more unique product identifiers with one or more object in response to receiving a request from another device, such as web server 340, point-of-sale system 330, product customization station 320, and/or an electronic client device 370-390. For example, data store 360 may associate a unique transaction identifier with an object associated with an account. In this embodiment, one or more products having unique product identifiers that are associated with the unique transaction identifier can be associated with the object. Thus, in one embodiment, if the unique transaction identifier corresponds to an order for a customized paint having a unique product identifier and the object associated with the account is a wall of a room, then the unique transaction identifier corresponding to the order can be associated with the wall such that the customized paint corresponds to the wall.

As another example, data store 360 may associate a unique product identifier with an object associated with an account. In this embodiment, one or more products having unique product identifiers are associated with the object. For example, if an order associated with the account contains six products, then one or more of the six products may be associated with an object associated with the account. Thus, in one embodiment, if a request is received by data store 360 from an electronic client device 370-390 to associate one of the products from the order with an object associated with the account, then the data store 360 may associate the product with the object. In an embodiment, a unique product identifier corresponding to the product is associated with a unique object identifier corresponding to the object. For example, if the object is a chair railing within a room and the product is a customized paint color, then a unique object identifier corresponding to the chair railing may be associated with a unique product identifier corresponding to the customized paint color. Numerous other embodiments are disclosed herein and variations are within the scope of this disclosure.

A request to associate one or more products and/or one or more transactions with an object may be made and/or received by any number of devices. In one embodiment, a request to associate one or more products and/or one or more transactions with an object is made and/or received by point-of-sale system 330. For example, point-of-sale system 330 may send a request to one or more data stores, such as data store 350 and/or data store 360. The request may include one or more transactions and/or one or more products that should be associated with the object. In another embodiment, a request to associate one or more products and/or one or more transactions with an object is made and/or received by web server 340 and/or one or more electronic client devices 370-390. For example, web server 340 may receive a request to associate one or more products and/or one or more transactions with an object from tablet computer 390. In this embodiment, web server 340 may receive the request and send another request to a data store, such as data store 360, to associate the one or more products and/or the one or more transactions with the object. In one embodiment, one or more products and/or one or more transactions are associated with an object based at least in part on unique product identifiers for the one or more products and/or unique transaction identifiers for the one or more transactions. For example, data store 360 may store associations between unique transaction identifiers and/or unique product identifiers with the object. Numerous other embodiments are disclosed herein and variations are within the scope of this disclosure.

Referring back to FIG. 5, after one or more unique transaction identifier and/or one or more unique product identifiers are associated with one or more objects, the method 500 proceeds to block 550. In block 550, a reorder request is received for at least one customized product. For example, in one embodiment, a reorder request is received by web server 340 from tablet computer 390 through network 310. In this embodiment, the reorder request includes a unique product identifier corresponding to the product that should be ordered. In another embodiment, the reorder request includes a unique transaction identifier corresponding to a previous order. In this embodiment, one or more products associated with the unique transaction identifier can be reordered in response to receiving the request. In another embodiment, a reorder request includes an object identifier of an object associated with an account. In this embodiment, the reorder request can correspond to one or more products associated with the object. Thus, if the object corresponds with two products, then both products may be reordered.

In some embodiments, a reorder request corresponds to only customized products. Thus, in this embodiment, if a reorder request comprises a unique transaction identifier corresponding to both customized and non-customized products, then only the customized products will be reordered. In other embodiments, a reorder request corresponds to only non-customized products. Thus, in this embodiment, if a reorder request comprises a unique transaction identifier corresponding to both customized and non-customized products, then only the non-customized products will be reordered. In yet other embodiments, a reorder request corresponds to both customized and non-customized products.

A request to reorder one or more products may be sent by and/or received by any number of devices. In one embodiment, a request to reorder one or more products sent by and/or received by point-of-sale system 330. For example, point-of-sale system 330 may send a request to one or more data stores, such as data store 350 and/or data store 360. The request may include one or more products that should be reordered. In another embodiment, a request to reorder one or more products is sent by and/or received by web server 340 and/or one or more electronic client devices 370-390. For example, web server 340 may receive a request to reorder one or more products from tablet computer 390. In this embodiment, web server 340 may receive the request and send another request to a data store, such as data store 360, to reorder the one or more products. In one embodiment, one or more products are reordered based at least in part on unique product identifiers for the one or more products and/or unique transaction identifiers associated with one or more products. For example, data store 360 may store associations between unique transaction identifiers and/or unique product identifiers such that if a reorder request is received and contains a unique transaction identifier, then one or more products associated with the unique transaction identifier can be reordered. In another embodiment, one or more products are reordered based at least in part on an object associated with an account. For example, data store 360 may store associations between objects and transactions and/or products such that if a reorder request is received and contains an object identifier for an object, then one or more products associated with the object can be reordered. Numerous other embodiments are disclosed herein and variations are within the scope of this disclosure.

Figure 6:
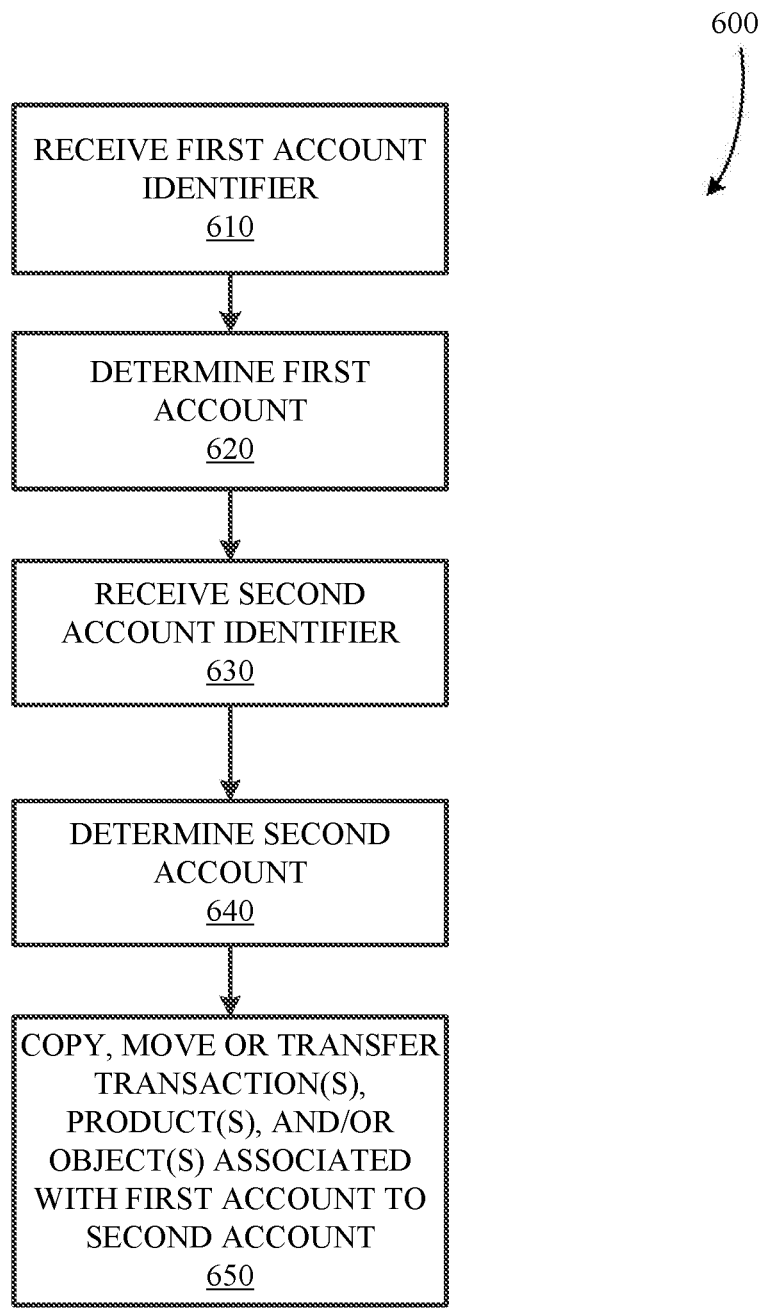
FIG. 6 is a flow chart illustrating a method of copying and/or moving information associated with a first online account to a second online account.

Illustrative Method of Copying or Moving Information From a First Online Account to a Second Online Account Referring now to FIG. 6, FIG. 6 is a flow chart illustrating a method 600 of copying and/or moving information associated with a first online account to a second online account. The description of the method 600 of FIG. 6 will be made with respect to FIG. 3 according to an embodiment. The description of method 500 will also be made with respect to electronic device 200 in FIG. 2 according to an embodiment.

The method 600 shown in FIG. 6 begins when a first account identifier is received. For example, referring to FIG. 3, web server 340 may receive a first account identifier from an electronic client device, 370-390, through network 310.

A first account identifier can be sent by any number of devices. In one embodiment, one or more electronic client devices, 370-390, sends a first account identifier. In other embodiments, product customization station 320, point-of-sale system 330, and/or web server 340 sends a first account identifier. A first account identifier can be received by any number of devices. In one embodiment, a first account identifier is received by web server 340. In other embodiments, a first account identifier is received by product customization station 320, point-of-sale system 330, and/or one or more electronic client devices, 370-390. In some embodiments, a first account identifier can be sent by and/or received by one or more electronic devices, such as electronic device 200 shown in FIG. 2.

A first account identifier can include information usable to identify a particular online account. For example, a first account identifier can include a unique username and password combination that is usable to identify a particular account. In other embodiments, a first account identifier comprises a unique username, a unique passphrase, one or more security questions, a credit card number, other information usable to identify a particular online account, or a combination thereof. Numerous other embodiments are disclosed herein and variations are within the scope of this disclosure.

Referring back to FIG. 6, once the first account identifier is received 610, the method 600 proceeds to block 620. In block 620, a first account corresponding to the first account identifier is determined. For example, referring to FIG. 3, a first account corresponding to the first account identifier may be determined by querying account information data store 360. In this embodiment, web server 340 can receive a request from an electronic client device, such as electronic client devices 370-390, through network 310. The request may include the first account identifier and the web server 340 may determine a first account associated with the first account identifier by querying data store 360 with the first account identifier. For example, if the first account identifier comprises a username and a password, then the web server 340 may query data store 360 to determine if an account associated with the username and password exists. Numerous other embodiments are disclosed herein and variations are within the scope of this disclosure.

Referring back to FIG. 6, once the first account is determined 620, the method 600 proceeds to block 630. In block 630, a second account identifier is received. For example, referring to FIG. 3, web server 340 may receive a second account identifier from an electronic client device, 370-390, through network 310.

A second account identifier can be sent by any number of devices. In one embodiment, one or more electronic client devices, 370-390, sends a second account identifier. In other embodiments, product customization station 320, point-of-sale system 330, and/or web server 340 sends a second account identifier. A second account identifier can be received by any number of devices. In one embodiment, a second account identifier is received by web server 340. In other embodiments, a second account identifier is received by product customization station 320, point-of-sale system 330, and/or one or more electronic client devices, 370-390. In embodiments, a second account identifier can be sent by and/or received by one or more electronic devices, such as electronic device 200 shown in FIG. 2.

In one embodiment, the second account identifier is sent by the same device that sent the first account identifier. In other embodiments, the second account identifier is sent by a different device than the device that sent the first account identifier. In one embodiment, the second account identifier is received by the same device that sent the first account identifier. In other embodiments, the second account identifier is received by a different device than the device that received the first account identifier.

A second account identifier can include any information usable to identify a particular online account. For example, a second account identifier can include a unique username and password combination that is usable to identify a particular account. In other embodiments, a second account identifier comprises a unique username, a unique passphrase, one or more security questions, a credit card number, other information usable to identify a particular online account, or a combination thereof. Numerous other embodiments are disclosed herein and variations are within the scope of this disclosure.

Referring back to FIG. 6, once the second account identifier is received 630, the method 600 proceeds to block 640. In block 640, a second account corresponding to the second account identifier is determined. In this embodiment, the second account is different than the first account. For example, referring to FIG. 3, a second account corresponding to the second account identifier may be determined by querying account information data store 360. In this embodiment, web server 340 can receive a request from an electronic client device, such as electronic client devices 370-390, through network 310. The request may include the second account identifier and the web server 340 may determine a second account associated with the second account identifier by querying data store 360 with the second account information. For example, if the second account identifier comprises a username and a password, then the web server 340 may query data store 360 to determine if an account associated with the username and password exists. Numerous other embodiments are disclosed herein and variations are within the scope of this disclosure.

Referring back to FIG. 6, once the second account is determined 640, the method 600 proceeds to block 650. In block 650, one or more transactions, products, and/or objects associated with the first account is transferred to the second account. For example, referring to FIG. 3, information related to one or more transactions, products, and/or objects associated with the first account may be updated to associate the one or more transactions, products, and/or objects with the second account. In one embodiment, information related to one or more transactions, products, and/or objects associated with the first account may be updated by updating information in a data store, such as data store 350 and/or data store 360 shown in FIG. 3. In another embodiment, information related to one or more transactions, products, and/or objects associated with the first account may be copied to the second account by adding additional associations in a data store, such as data store 350 and/or data store 360, to the one or more transactions, products, and/or objects. In yet another embodiment, information related to one or more transactions, products, and/or objects associated with the first account may be moved to the second account by updating associations in a data store, such as data store 350 and/or data store 360.

In one embodiment, the one or more transactions, products, and/or objects associated with the first account are transferred to the second account such that the one or more transactions, products, and/or objects are no longer associated with the first account. In other embodiments, the one or more transactions, products, and/or objects associated with the first account are transferred to the second account such that the one or more transactions, products, and/or objects are associated with both the first account and the second account. In this embodiment, an update made to a transaction, product, and/or object in the first account may be made to the transferred transaction, product, and/or object in the second account as well. Similarly, in an embodiment, an update made to a transferred transaction, product, and/or object in the second account can be automatically made in the first account. In other embodiments, an update made to a transferred transaction, product, and/or object in the first account and/or the second account only affects that transaction, product, and/or object and not the objects in another account. Numerous other embodiments are disclosed herein and variations are within the scope of this disclosure.

In an embodiment, one or more transactions, products, and/or objects associated with the first account are updated, moved, copied, or otherwise transferred to a second account in response to a request from an electronic device. For example, referring to FIG. 3, one or more transactions, products, and/or objects associated with the first account can be updated in data store 350 and/or data store 360 in response to the web server 340 receiving a request from an electronic client device, such as electronic client devices 370-390, through network 310. In this embodiment, the request can include a selection of one or more transactions, products, and/or objects associated with the first account that should be moved to the second account. The request may include information regarding the first account, such as a first account identifier, and/or information regarding the second account, such as a second account identifier.

In another embodiment, one or more transactions, products, and/or objects associated with the first account are updated, moved, copied, or otherwise transferred to a second account based at least in part on a predefined association between the first account and the second account. For example, in one embodiment, information may have previously been stored in a data store, such as data store 350 and/or data store 360, associating a first account with a second account. As another example, information may have previously been stored in a data store, such as data store 350 and/or data store 360, associating an object in a first account with a second account. For example, a room, a floor plan, and/or another object may be associated with a first account and a second account. In this embodiment, if a transaction, product, and/or another object associated with the object in the first account is added, removed, or updated in the first account, then the information is automatically added, removed, or updated in the second account. In some embodiments, if a transaction, product, and/or another object associated with the object in the first account is added, removed, or updated in the second account, then the information is automatically added, removed, or updated in the first account. The methods/systems disclosed herein facilitate the transfer of information from a first account to another (or second account) whenever it is desired to do so, for example, when a previous owner of a property, home, or building sells or otherwise transfers the property, home, or building to a new owner, or alternatively to a renter or occupant, who is associated with the other account. The transfer, move, or addition, can be made with respect to the entirety of the transaction, objects, and product, or instead with respect to a chosen subset thereof. The financial aspects of the transactions (price, payment method, and the like), for example, can be omitted from the transfer and/or visibility in the second account, while the product and object attributes are transferred and/or remain accessible for viewing via the second account. In some embodiments, the extent of the transferred information can be selectively controlled by the transferor account holder. Numerous other embodiments are disclosed herein and variations are within the scope of this disclosure.

In some embodiments, aspects of the present invention may be implemented within one or more of the systems described in U.S. patent application Ser. No. 10/796,485 by Stone et al., filed Mar. 9, 2004, now U.S. Pat. No. 7,909,241, and entitled "Systems, Methods and Computer Program Products For Implementing Processes Relating To Retail Sales," which is hereby incorporated by reference in its entirety. In some embodiments, aspects of the present invention may be implemented within one or more of the systems described in U.S. patent application Ser. No. 12/930,009 by Stone et al., filed Dec. 24, 2010, and entitled "Systems, Methods and Computer Program Products for Implementing Processes Relating To Retail Sales," which is hereby incorporated by reference in its entirety.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A product customization station adapted to customize one or more base products and comprising:
   a processor; and
   a non-transitory computer readable medium coupled to the processor, wherein the non-transitory computer readable medium includes instructions, that when executed by the processor, cause the product customization station to:
   receive base product information identifying the one or more base products, the one or more base products having corresponding one or more base product identifiers;
   receive customization information indicating one or more additions, deletions, and/or alterations to the one or more base products;
   customize the one or more base products based on the customization information to convert the one or more base products into one or more customized products;
   generate (i) a customization identifier which identifies a customization that results from customizing the one or more base products or (ii) a customized product identifier which identifies the one or more customized products which result from customizing the one or more base products; and
   cause, based on sending the customization identifier or the customized product identifier to a point-of-sale device embodied in hardware that is separate and distinct from hardware that embodies the product customization station, the point-of-sale device to:
   receive an account identifier associated with a consumer account; and
   associate the base product information and the customization identifier to the consumer account, or associate the customized product identifier to the consumer account.

2. The product customization station of claim 1, wherein the instructions, when executed by the processor, cause the product customization station to associate the base product information and the customization identifier with an object linked to the consumer account.

3. The product customization station of claim 1, further comprising a reader device adapted to detect indicia that represents the base product information and input the base product information into the product customization station.

4. The product customization station of claim 3, wherein the base product information comprises a product identifier received from a barcode, QR code, UPC code, FOB, or RFID.

5. The product customization station of claim 1, wherein the customization information comprises one or more customization parameters to be applied to the one or more base products.

6. The product customization station of claim 5, wherein the one or more customization parameters comprises at least one of a potential color, size, length, width, depth, height, material, pattern, shade, or shape.

7. A method comprising:
receiving, at a product customization station, base product information identifying one or more base products, the one or more base products having corresponding one or more base product identifiers;
receiving, at the product customization station, customization information indicating one or more additions, deletions, and/or alterations to the one or more base products;
customizing, at the product customization station, the one or more base products based on the customization information to convert the one or more base products into one or more customized products;
generating, at the product customization station, (i) a customization identifier which identifies a customization that results from customizing the one or more base products or (ii) a customized product identifier which identifies the one or more customized products which result from customizing the one or more base products;
receiving, at a point-of-sale device, an account identifier associated with a consumer account, the point-of-sale device embodied in hardware that is separate and distinct from hardware that embodies the product customization station; and
associating, at the point-of-sale device, the base product information and the customization identifier to the consumer account, or associating, at the point-of-sale device, the customized product identifier to the consumer account.

8. The method of claim 7, wherein the one or more base products comprise at least one of a paint, door, molding, window, blind, curtain, chain, lumber, or wire.

9. The method of claim 7, wherein the customization information includes information corresponding to a particular color of paint.

10. The method of claim 7, further comprising: generating the customization identifier in a format that is readable or receivable by the point-of-sale device.

11. The method of claim 7, wherein the customization information comprises one or more customization parameters to be applied to the one or more base products.

12. The method of claim 7, further comprising generating a machine-readable code that represents the customization identifier to be affixed to a customized product or packaging of the one or more customized products.

13. The method of claim 7, wherein the base product information comprises a product identifier received from a barcode, QR code, UPC code, FOB, or RFID.

14. A system comprising:
a product customization station configured to:
receive customization information indicating one or more additions, deletions, and/or alterations to one or more base products having corresponding one or more base product identifiers;
customize the one or more base products based on the customization information to convert the one or more base products into one or more customized products; and
generate (i) a customization identifier which identifies a customization that results from customizing the one or more base products or (ii) a customized product identifier which identifies the one or more customized products which result from customizing the one or more base products; and
a point-of-sale device embodied in hardware that is separate and distinct from hardware that embodies the product customization station, wherein the point-of-sale device is configured to:
receive the customization identifier or the customized product identifier directly or indirectly from the product customization station;
receive base product information identifying the one or more base products;
receive an account identifier associated with a consumer account; and
associate the base product information and the customization identifier to the consumer account, or associate the customized product identifier to the consumer account.

15. The system of claim 14, wherein the point-of-sale device is adapted to receive the customization identifier or the customized product identifier, the base product information, and the account identifier during a transaction conducted at the point-of-sale device.

16. The system of claim 15, wherein the product customization station is adapted to print indicia that identifies the customization information, and the point-of-sale device is adapted to detect the indicia.

17. The system of claim 14, further comprising a web server configured to receive the customization identifier or the customized product identifier, the web server being remotely accessible by a consumer to allow the consumer to instruct the web server to associate the customization information with one or more objects associated with the consumer account.

18. The system of claim 14, wherein the product customization station is a paint customization station, and wherein the one or more base products is paint and the customization information identifies a color of paint that results from customization of the paint by the paint customization station.

19. The product customization station of claim 1, wherein the point-of-sale device is located at a retail store where the one or more base products and the one or more customized products are physically located and available to a purchaser.

20. The product customization station of claim 19, wherein each base product identifier is stored in a data store and usable to retrieve, from the data store, first information about the corresponding base product, and wherein the customized product identifier is stored in the data store and usable to retrieve, from the data store, second information about the one or more customized products.

* * * * *